US010326968B2

(12) United States Patent
Iversen et al.

(10) Patent No.: US 10,326,968 B2
(45) Date of Patent: Jun. 18, 2019

(54) INVISIBLE OR LOW PERCEPTIBILITY OF IMAGE ALIGNMENT IN DUAL PROJECTION SYSTEMS

(71) Applicant: IMAX Corporation, Mississauga (CA)

(72) Inventors: Steen Svendstorp Iversen, Kongens Lyngby (DK); Weining Tan, Mississauga (CA); Matthew O'Dor, Toronto (CA)

(73) Assignee: IMAX Corporation, Mississauga, Ontario (CA)

( * ) Notice: Subject to any disclaimer, the term of this patent is extended or adjusted under 35 U.S.C. 154(b) by 45 days.

(21) Appl. No.: 14/351,839

(22) PCT Filed: Oct. 19, 2012

(86) PCT No.: PCT/IB2012/055749
§ 371 (c)(1),
(2) Date: Apr. 14, 2014

(87) PCT Pub. No.: WO2013/057714
PCT Pub. Date: Apr. 25, 2013

(65) Prior Publication Data
US 2014/0292817 A1    Oct. 2, 2014

Related U.S. Application Data

(60) Provisional application No. 61/549,580, filed on Oct. 20, 2011.

(51) Int. Cl.
*H04N 9/31* (2006.01)
*G03B 17/54* (2006.01)
(Continued)

(52) U.S. Cl.
CPC ............ *H04N 9/3147* (2013.01); *G03B 17/54* (2013.01); *G03B 35/20* (2013.01); *G06T 3/20* (2013.01);
(Continued)

(58) Field of Classification Search
CPC .. H04N 9/3147; H04N 9/3185; H04N 9/3179; H04N 9/3188; H04N 9/3182
See application file for complete search history.

(56) References Cited

U.S. PATENT DOCUMENTS

| 4,523,226 A | 6/1985 | Lipton et al. |
| 4,868,773 A | 9/1989 | Coyle et al. |

(Continued)

FOREIGN PATENT DOCUMENTS

| CN | 1367883 | 9/2002 |
| CN | 1417637 | 5/2003 |

(Continued)

OTHER PUBLICATIONS

U.S. Appl. No. 13/641,676, Notice of Allowance dated Jun. 10, 2014, 6 pages.
(Continued)

*Primary Examiner* — Bao-Luan Q Le
(74) *Attorney, Agent, or Firm* — Kilpatrick Townsend and Stockton LLP

(57) ABSTRACT

A dual projection system can align displayed images using an alignment pattern. The alignment pattern can be used to modify part of an image content frame of an image data sequence. Two image data sequences can be spatially aligned based on the modification to part of the image content frame using the alignment pattern. An image content frame may be warped and displayed. The displayed warped image content frame can be captured. A set of transformation vectors can be determined based on the captured image (Continued)

content frame and alignment image data. Stored transformation data can be updated using the set of transformation vectors and the updated transformation data can be used to spatially align two image data sequences.

24 Claims, 12 Drawing Sheets

(51) Int. Cl.
| | |
|---|---|
| *G03B 35/20* | (2006.01) |
| *H04N 13/04* | (2006.01) |
| *H04N 13/02* | (2006.01) |
| *G06T 3/20* | (2006.01) |

(52) U.S. Cl.
CPC .......... *H04N 9/317* (2013.01); *H04N 9/3185* (2013.01); *H04N 9/3194* (2013.01); *H04N 13/0207* (2013.01); *H04N 13/0246* (2013.01); *H04N 13/0425* (2013.01); *H04N 13/0459* (2013.01)

(56) References Cited

U.S. PATENT DOCUMENTS

| | | | |
|---|---|---|---|
| 5,070,403 A | 12/1991 | Wilkinson | |
| 5,384,869 A | 1/1995 | Wilkinson et al. | |
| 5,561,474 A | 10/1996 | Kojima et al. | |
| 5,631,975 A | 5/1997 | Bouchard et al. | |
| 5,654,805 A | 8/1997 | Boon | |
| 5,663,775 A | 9/1997 | Kawamura et al. | |
| 5,920,652 A | 7/1999 | Wilkinson | |
| 6,018,596 A | 1/2000 | Wilkinson | |
| 6,128,415 A | 10/2000 | Hultgren et al. | |
| 6,222,593 B1* | 4/2001 | Higurashi ............. | G03B 37/04 |
| | | | 315/368.12 |
| 6,243,070 B1 | 6/2001 | Hill et al. | |
| 6,396,505 B1 | 5/2002 | Lui et al. | |
| 6,538,705 B1* | 3/2003 | Higurashi ............. | G03B 37/04 |
| | | | 315/368.12 |
| 6,703,988 B1 | 3/2004 | Fergason et al. | |
| 6,733,138 B2 | 5/2004 | Raskar | |
| 6,751,006 B2 | 6/2004 | Zhou et al. | |
| 6,760,075 B2 | 7/2004 | Mayer et al. | |
| 6,771,272 B2* | 8/2004 | Deering ............... | G06T 3/0081 |
| | | | 345/581 |
| 6,804,406 B1 | 10/2004 | Chen | |
| 6,843,564 B2 | 1/2005 | Putilin et al. | |
| 6,924,816 B2* | 8/2005 | Deering ............... | G06T 3/0081 |
| | | | 345/589 |
| 6,940,529 B2* | 9/2005 | Deering ............... | G06T 3/0081 |
| | | | 315/370 |
| 6,984,043 B2 | 1/2006 | Nakamura et al. | |
| 7,002,533 B2 | 2/2006 | Sayag | |
| 7,002,589 B2* | 2/2006 | Deering ............... | G06T 3/0081 |
| | | | 345/581 |
| 7,079,157 B2* | 7/2006 | Deering ............... | G06T 5/006 |
| | | | 315/370 |
| 7,097,311 B2 | 8/2006 | Jaynes et al. | |
| 7,111,941 B2 | 9/2006 | Allen et al. | |
| 7,127,084 B1 | 10/2006 | Mauk | |
| 7,274,810 B2 | 9/2007 | Reeves et al. | |
| 7,339,625 B2 | 3/2008 | Matthys et al. | |
| 7,357,517 B2 | 4/2008 | Hasegawa | |
| 7,660,470 B2 | 2/2010 | Yano | |
| 7,676,072 B2 | 3/2010 | Sugiyama | |
| 7,740,361 B2 | 6/2010 | Jaynes et al. | |
| 7,852,327 B2 | 12/2010 | Chen et al. | |
| 7,866,832 B2 | 1/2011 | Jaynes et al. | |
| 7,891,818 B2 | 2/2011 | Christensen et al. | |
| 7,936,361 B2 | 5/2011 | Aufranc et al. | |
| 7,954,954 B2 | 6/2011 | Aufranc et al. | |
| 8,016,426 B2 | 9/2011 | Artonne et al. | |
| 8,453,148 B1 | 5/2013 | Hobbs et al. | |
| 8,567,953 B2* | 10/2013 | O'Dor ................. | H04N 9/3147 |
| | | | 250/205 |
| 8,842,222 B2 | 9/2014 | Iversen | |
| 8,944,612 B2* | 2/2015 | Chang .................... | G03B 21/13 |
| | | | 349/5 |
| 9,961,316 B2 | 5/2018 | Tan et al. | |
| 2001/0024231 A1 | 9/2001 | Nakamura et al. | |
| 2002/0008697 A1* | 1/2002 | Deering ................. | G06T 5/006 |
| | | | 345/418 |
| 2002/0012004 A1* | 1/2002 | Deering ................ | G06T 3/0081 |
| | | | 345/589 |
| 2002/0015052 A1* | 2/2002 | Deering ................ | G06T 3/0081 |
| | | | 345/647 |
| 2002/0027608 A1 | 3/2002 | Johnson et al. | |
| 2002/0070944 A1* | 6/2002 | Deering ................ | G06T 3/0081 |
| | | | 345/581 |
| 2002/0196538 A1 | 12/2002 | Lantz et al. | |
| 2003/0206179 A1* | 11/2003 | Deering ................ | G06T 3/0081 |
| | | | 345/589 |
| 2004/0001184 A1 | 1/2004 | Gibbon et al. | |
| 2004/0085256 A1 | 5/2004 | Hereld et al. | |
| 2004/0184007 A1 | 9/2004 | Silverstein et al. | |
| 2004/0239885 A1 | 12/2004 | Jaynes et al. | |
| 2005/0036673 A1 | 2/2005 | Ohba et al. | |
| 2005/0082990 A1 | 4/2005 | Elliott et al. | |
| 2005/0083402 A1* | 4/2005 | Klose ................... | H04N 9/3147 |
| | | | 348/52 |
| 2006/0033890 A1 | 2/2006 | Hasegawa | |
| 2006/0221249 A1 | 10/2006 | Lin et al. | |
| 2007/0024764 A1 | 2/2007 | Chung | |
| 2007/0091277 A1 | 4/2007 | Damera-Venkata et al. | |
| 2007/0132965 A1 | 6/2007 | Damera-Venkata et al. | |
| 2007/0133794 A1 | 6/2007 | Cloutier et al. | |
| 2007/0171380 A1 | 7/2007 | Wright et al. | |
| 2007/0285663 A1 | 12/2007 | Hewitt et al. | |
| 2008/0101725 A1* | 5/2008 | Lin ....................... | G06K 9/3216 |
| | | | 382/286 |
| 2008/0143969 A1 | 6/2008 | Aufranc et al. | |
| 2008/0143978 A1 | 6/2008 | Damera-Venkata et al. | |
| 2008/0266321 A1 | 10/2008 | Aufranc et al. | |
| 2008/0297451 A1 | 12/2008 | Marcu et al. | |
| 2008/0309884 A1* | 12/2008 | O'Dor ................. | H04N 9/3147 |
| | | | 353/7 |
| 2009/0027304 A1 | 1/2009 | Aufranc et al. | |
| 2009/0102915 A1 | 4/2009 | Arsenich | |
| 2009/0213337 A1 | 8/2009 | Kondo et al. | |
| 2009/0244684 A1 | 10/2009 | Gollier | |
| 2009/0273719 A1 | 11/2009 | Kuwata et al. | |
| 2009/0278918 A1 | 11/2009 | Marcus et al. | |
| 2010/0008568 A1 | 1/2010 | Curti et al. | |
| 2010/0103379 A1* | 4/2010 | Fiess ................... | H04M 1/0272 |
| | | | 353/7 |
| 2010/0177112 A1 | 7/2010 | Miyasaka et al. | |
| 2010/0201682 A1 | 8/2010 | Quan et al. | |
| 2011/0057943 A1 | 3/2011 | Ivashin et al. | |
| 2011/0199586 A1 | 8/2011 | Morikuni | |
| 2011/0234920 A1 | 9/2011 | Nelson | |
| 2011/0309999 A1* | 12/2011 | Chang .................... | G03B 21/13 |
| | | | 345/1.1 |
| 2012/0127323 A1* | 5/2012 | Kasuya ................. | G03B 17/54 |
| | | | 348/189 |
| 2012/0176415 A1* | 7/2012 | Chao ..................... | H04N 9/3173 |
| | | | 345/666 |
| 2013/0093805 A1 | 4/2013 | Iversen | |
| 2013/0201403 A1 | 8/2013 | Iversen | |
| 2014/0192076 A1 | 7/2014 | Tan et al. | |
| 2014/0300708 A1 | 10/2014 | Iversen et al. | |

FOREIGN PATENT DOCUMENTS

| | | |
|---|---|---|
| CN | 1532586 | 9/2004 |
| CN | 1598690 | 3/2005 |
| CN | 1735173 | 2/2006 |
| CN | 1846213 | 10/2006 |
| CN | 1988674 | 6/2007 |
| CN | 101180873 | 5/2008 |
| CN | 101507286 | 8/2009 |
| CN | 102123292 | 7/2011 |

(56) References Cited

FOREIGN PATENT DOCUMENTS

| | | |
|---|---|---|
| DE | 2827622 | 1/1980 |
| DE | 19545356 | 5/1996 |
| EP | 899688 | 3/1999 |
| EP | 1297488 | 4/2003 |
| EP | 1460856 | 9/2004 |
| JP | 08168039 | 6/1996 |
| JP | 09046553 | 2/1997 |
| JP | 09326981 | 12/1997 |
| JP | 2000184317 | 6/2000 |
| JP | 2001051346 | 2/2001 |
| JP | 2006054632 | 2/2006 |
| JP | 2006139057 | 6/2006 |
| JP | 2008182706 | 8/2008 |
| JP | 2008539675 | 11/2008 |
| JP | 2009069818 | 4/2009 |
| JP | 2009206665 | 9/2009 |
| JP | 2009260932 | 11/2009 |
| JP | 2010039160 | 2/2010 |
| JP | 2011040958 | 2/2011 |
| RU | 2165192 | 4/2001 |
| RU | 2168192 | 5/2001 |
| WO | 9621171 | 7/1996 |
| WO | 2004039085 | 5/2004 |
| WO | 2006116536 | 11/2006 |
| WO | 2010147451 | 12/2010 |
| WO | 2011134834 | 11/2011 |
| WO | 2011160629 | 12/2011 |
| WO | 2013024430 | 2/2013 |
| WO | 2013057714 | 4/2013 |
| WO | 2013057717 | 4/2013 |

OTHER PUBLICATIONS

U.S. Appl. No. 13/806,105, Non Final Office Action dated Oct. 10, 2014, 11 pages.
Chinese Patent Application No. 2012800515219, First Office. Action dated Jul. 8, 2015, 10 pages (5 pages for the original document and 5 pages for the English translation).
Paschotta Allomorphic Prism Pairs, Encyclopedia of Laser Physics and Technology, Oct. 2008, 2 pages.
Roth et al., 0.2: Wide Gamut, High Brightness Multiple Primaries Single Panel Projection Displays, SID Symposium Digest of Technical Papers, vol. 34. Issue 1, May 1, 2003, pp. 118-121.
U.S. Appl. No. 13/641,676, Final Office Action dated Apr. 28, 2014, 9 pages.
Cotting et al., Embedding Imperceptible Patterns into Projected Images for Simultaneous Acquisition and Display, Proceedings of the third IEEE and ACM International Symposium on Mixed and Augmented Reality, Nov. 2, 2004, pp. 100-109.
Zollmann et al., Digital Illumination for Augmented Studios, Journal of Virtual Reality and Broadcasting, Dec. 1, 2006, 10 pages.
Zollmann et al., Imperceptible Calibration for Radiometric Compensation, Eurographics, Jan. 1, 2007, 4 pages.
European Patent Application No. 12841745.8, Extended European Search Report dated Dec. 7, 2015, 16 pages.
"XLM HD30—The ultimate high-brightness projector for high-resolution multi-windowing", URL:http://www.projectorcentral.com/pdf/projector_spec_3403.pdf, XP55014864, Jul. 1, 2006, 4 pages.
Jacobson et al., "Linear Fusion of Image Sets for Display", IEEE Transactions on Geoscience and Remote Sensing, IEEE Service Center, Piscataway, NJ, US, vol. 45, No. 10, XP011192516, ISSN: 0196-2892, DOI : 10. 1109/TGRS, Oct. 1, 2007, pp. 3277-3288.
Li et al., "Optical blending for multi-projector display wall systems", IEEE LEOS 12th Annual Meeting Conference Proceedings, Leos'99, vol. 1, XPOI0361258, DOI : 10.1109/LEOS: 978-0-7803-5634-4, Nov. 8, 1999, 2 pages.
Mayer , "Design Considerations and Applications for Innovative Display Options Using Projector Arrays", Proceedings of SPIE—The International Society for Optical Engineering, vol. 2650, Jan. 1996, pp. 131-139.
Okatani et al., "Study of Image Quality of Superimposed Projection Using Multiple Projectors", IEEE Transactions on Image Processing, IEEE Service Center, vol. 18, No. 2, XP011249562, ISSN: 1057-7149, Feb. 2009, pp. 424-429.
PCT/IB/2012/055749, "International Search Report and Written Opinion", dated Jan. 23, 2013, 7 pages.
Seo et al., "Double-Layer Projection Display System Using Scattering Polarizer Film", Japanese Journal of Applied Physics, vol. 47, No. 3, XP55011651, ISSN: 0021-4922, DOI : 10.1143/JJAP. 47.1602, Mar. 2008, pp. 1602-1605.
European Patent Application No. 12841745.8 , "Response to Rules 70(2) and 70a(2) Communication" filed Jun. 30, 2016, 32 pages.
Japanese Patent Application No. 2014-536397, Office Action dated Jun. 28, 2016, 7 pages (3 pages for the English translation and 4 pages for the original document).
Chinese Patent Application No. 201280051370.7, "Office Action", dated Oct. 19, 2018, 7 pages.
Indian Patent Application No. 442/CHENP/2013, "First Examination Report", dated Sep. 27, 2018, 5 pages.
CA 2,842,572 , "Office Action," dated Jul. 4, 2018, 5 pages.
EP 12841745-8 , "Office Action," dated May 3, 2018, 8 pages.
CA 2,847,999, "Office Action," dated Jul. 16, 2018, 4 pages.

* cited by examiner

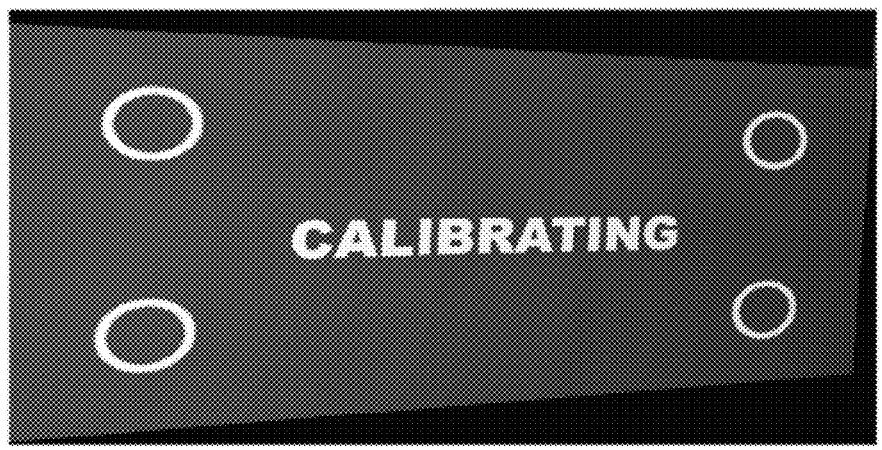
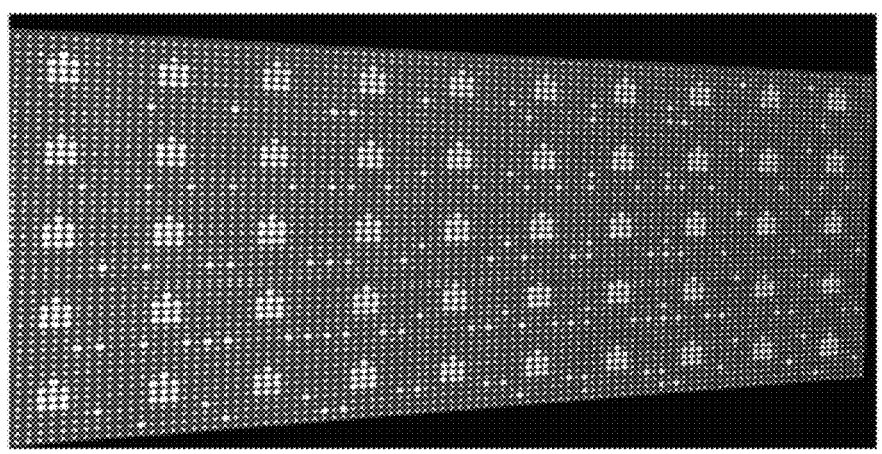
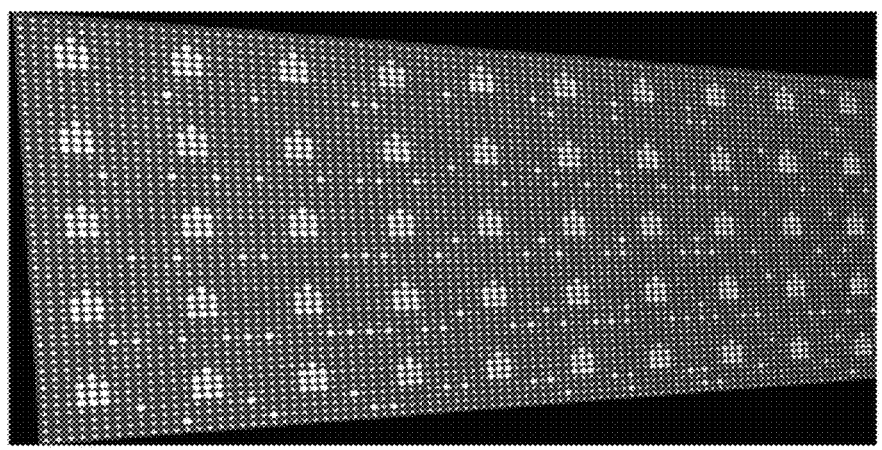
Figure 6

| SrcX | SrcY | TrgX | TrgY |
|---|---|---|---|
| 0.1537 | 0.3451 | 0.1489 | 0.3502 |
| 0.1658 | 0.4011 | 0.1620 | 0.4098 |
| 0.1702 | 0.4121 | 0.1768 | 0.4235 |
| 0.1780 | 0.4174 | 0.1826 | 0.4225 |
| 0.1881 | 0.4232 | 0.1909 | 0.4327 |
| 0.1993 | 0.4380 | 0.2003 | 0.4415 |
| 0.2040 | 0.4436 | 0.2087 | 0.4510 |

INVISIBLE OR LOW PERCEPTIBILITY OF IMAGE ALIGNMENT IN DUAL PROJECTION SYSTEMS

CROSS-REFERENCE TO RELATED APPLICATIONS

This is a U.S. national phase under 35 U.S.C. 371 of International Patent Application No. PCT/IB2012/055749 entitled "Invisible or Low Perceptibility of Image Alignment in Dual Projection Systems," filed Oct. 19, 2012, which claims benefit of priority under PCT Article 8 of U.S. Provisional Application No. 61/549,580, filed Oct. 20, 2011, each of which is incorporated herein by reference in its entirety.

TECHNICAL FIELD

The present invention relates generally to image projection systems and, more particularly (although not necessarily exclusively), to dual projection systems for projecting images having invisible or lowered perceptible image alignment.

BACKGROUND

Two projector projection and stereoscopic projection for large screens is increasing in use. In some cases, the stereoscopic effect can be achieved with a single projector, capable of delivering a left eye image and a right eye image to the observer's left and right eyes respectively, instead of the traditional approach of using two projectors. The market demand for single projector solutions is caused by the desire to eliminate difficult alignment of the two projectors. However, for larger screens, demands in terms of resolution and brightness may go as high as 4K resolution and near a 100.000 lumen. Large screens for two-dimensional (2D) presentations may require two projectors to obtain an acceptable level of image illumination. Single projector technology may not scale easily up to such requirements and larger screens accounts to less than 1% of the hundreds of thousands of projection screens worldwide, so the market may not be able to drive the large investments in development needed for such a single projector solution in the foreseeable future.

Hence, big screens demanding 4K resolution and up towards 100,000 lumen brightness may still need dual projector solutions. In large screen projection, alignment of the two projectors can be difficult, but important. The traditional way of mechanically adjusting the projectors may not be satisfactory for large screens because of limited tolerances in mechanical positioning systems and tolerances in optics, which can make it impossible for a perfect alignment of the projectors. A warping system can be included in one of the projectors, so a technician can electronically adjust a geometric correction, for example by the use of a reference grid, until the images are aligned. This manual alignment is cumbersome and time consuming work. Some systems incorporate auto-alignment systems, where the system can perform automatic alignment, running through an iterative process with a feedback camera.

Two projector systems can experience spatial changes in image alignment between the two projected images as a result of thermal changes that may occur and cause image shifts in a relatively short amount of time such as within a duration of a presentation. For example, a laser projection system may experience a relatively quick change in optic performance and cause a global horizontal, vertical, or rotational shift of the image. Therefore, having a means to realign the displayed images automatically during a presentation without being visible to a viewer would be beneficial.

FIG. 1 shows a configuration of prior art. The solid, arrowed lines are image signal paths. A projector pair that includes a first projector 1 and a second projector 2 is projecting an image pair such as a left eye image delivered by a first image generator 4 and a right eye image delivered by a second image generator 5 onto a projection surface 3. A warping system 6 is capable of geometrically correcting the left eye image, so it is projected to align with the right eye image. The warping system 6 may be capable of doing the geometric correction in real time during, for example, a presentation of a moving image. A camera 7 can record the images projected onto the projection surface 3 and deliver the recorded image data to a calibration system 8 that is capable of processing the received camera data, delivering geometry correction data to the warping system 6 and outputting calibration image sequences suited for alignment in an iterative closed-loop feedback system that will run through an alignment process over some seconds or minutes. A switch 9, can switch projectors between the image generators for content presentation and the output of the calibration circuit for auto-alignment. This configuration is an advantage over manual alignment, though for big screen installations operating over many hours at a time it may be necessary to perform realignment several times during the operation because of thermally and otherwise induced movements in mechanical and optical parts, and if the auditorium is filled with audience most of the time, it is not optimal to have to perform distracting realignments that are noticeable by the audience. If the realignment is to occur while the projection system is showing image content, then it is desirable that the alignment is done in a way that is invisible to viewers.

Systems and methods are desirable to overcome the above mentioned obstacles and provide for low perceptibility or invisible automatic alignment, that may in some circumstances display calibration images sequences for a fraction of a second, hence in practical use often go unnoticed, and further eliminate the need for projector switching and closed-loop feedback circuits.

SUMMARY

Certain aspects relate to systems and methods for spatially aligning image sequences using an alignment pattern.

In one aspect, an alignment pattern is accessed. The alignment pattern has at least one alignment feature. A portion of image content in a frame of a first digital image sequence is modified by a projection system using the at least one alignment feature. The first digital image sequence and a second digital image sequence are spatially aligned based on the portion modified by the projection system when the first digital image sequence and the second digital image sequence are displayed.

At least one feature includes the portion modified using the at least one alignment feature being at least one color channel.

At least one feature includes modifying, by the projection system, a second portion of image content of a subsequent frame in the first digital image sequence that is different than the portion. The frame with the portion of image content modified by the projection system and the subsequent frame with the second portion of image content modified by the projection system includes all of the alignment pattern.

At least one feature includes converting portions of the frame with the at least one alignment feature. The portions are distributed among multiple frames that are displayed. The portions have a random spatial sequence.

At least one feature includes modifying the portion of the image content in the frame of the first digital image sequence by replacing at least part of the portion with the at least one alignment feature. The portion has black image pixels around the at least one alignment feature.

At least one feature includes the at least one alignment feature within the portion having an average illumination level substantially corresponding to the at least part of the portion replaced with the at least one alignment feature.

At least one feature includes the at least one alignment feature within the portion having an average color balance corresponding to the at least part of the portion replaced with the at least one alignment feature.

At least one feature includes the at least one alignment feature having a Gaussian illumination profile.

At least one feature includes capturing, as a captured second image sequence frame, a displayed second digital image sequence frame modified with alignment image data that includes the alignment pattern. A displayed first digital image sequence modified with the alignment image data is captured as a captured first image sequence frame. A set of transformation vectors is determined based on a spatial difference between the alignment image data in the captured second image sequence frame and the captured first image sequence frame. A displayed first image of the first digital image sequence and a displayed second image of the second digital image sequence are spatially aligned using the set of transformation vectors.

At least one feature includes the portion being a whole image frame of at least one color channel.

At least one feature includes modifying the portion of image content in the frame in the first digital image sequence by replacing at least part of the portion with the at least one alignment feature. The at least one alignment feature has high frequency content of at least one color channel. The portion has image content pixels around the at least one alignment feature. The image content pixels are low frequency image content of the at least one color channel.

In another aspect, a displayed first image sequence frame that has image content modified with alignment data is captured as a captured first image sequence frame. A displayed second image sequence frame that has image content modified with the alignment data is captured as a captured second image sequence frame. A set of transformation vectors is determined based on a spatial difference between the alignment data in the captured second image sequence frame and the captured first image sequence frame. A displayed first image of a first image sequence and a displayed second image of a second image sequence are spatially aligned using the set of transformation vectors.

At least one feature includes modifying image content in at least one frame in the first image sequence and in the second image sequence with the alignment data to generate a modified first image sequence frame and a modified second image sequence frame. The modified second image sequence frame is warped with stored transformation data to generate a warped second image sequence frame. The warped second image sequence frame is displayed as the displayed second image sequence frame and the modified first image sequence frame is displayed as the displayed first image sequence frame. The stored transformation data is updated with the set of transformation vectors to produce updated transformation data. Spatially aligning the displayed first image of the first image sequence and the displayed second image of the second image sequence includes using the updated transformation data.

At least one feature includes modifying the at least one frame in the first image sequence and in the second image sequence with the alignment data by accessing the alignment data that includes an alignment pattern having at least one alignment feature and modifying a portion of image content in a frame in the first image sequence by a projection system using the at least one alignment feature. The first image sequence and the second image sequence each include digital image data. The first image sequence and the second image sequence are spatially aligned based on the portion modified by the projection system when displaying the first image sequence and the second image sequence.

At least one feature includes modifying the at least one frame in the first image sequence and in the second image sequence with the alignment data by accessing the alignment data that includes an alignment pattern, modifying a first portion of image content in a frame of the first image sequence using the alignment pattern, and modifying, using the alignment pattern, a second portion of image content in a subsequent frame of the first image sequence that is different than the first portion. The frame with the first portion modified using the alignment pattern and the subsequent frame with the second portion modified using the alignment pattern include all of the alignment pattern.

At least one feature includes modifying the at least one frame in the first image sequence and in the second image sequence based on watermarking the alignment data onto image data in the at least one frame in each of the first image sequence and the second image sequence by one of spatial encoding to watermark the alignment data onto the image data or time domain encoding to watermark the alignment data onto the image data. The alignment data is extracted from at least one of the captured second image sequence frame or the captured first image sequence frame that includes a watermarked frame.

At least one feature includes determining a first set of transformation vectors based on a difference between the alignment data and the captured second image sequence frame including a modification using the alignment data. A second set of transformation vectors is determined based on a difference between the alignment data and the captured first image sequence frame including a modification using the alignment data. The displayed first image of the first image sequence and the displayed second image of the second image sequence are spatially aligned using the first set of transformation vectors and the second set of transformation vectors.

At least one feature includes determining a centroid of alignment features of the captured first image sequence frame and the captured second image sequence frame using a low resolution image sensor.

In another aspect, a dual display projection system is provided. The dual display projection system includes a server that has a memory unit and a processor device. The memory unit can store a first image sequence, a second image sequence, and alignment data that is an alignment pattern having at least one alignment feature. The processor device can modify a portion of image content in a frame in a first image sequence by using the at least one alignment feature. The processor device can spatially align the first image sequence and a second image sequence based on the modified portion when displaying the first image sequence and the second image sequence.

At least one feature includes the processor device being adapted for modifying image content in a second frame of the second image sequence with the alignment data that includes the alignment pattern to create a modified second image frame and warping the modified second image frame with stored transformation data to generate a warped second image frame. The system includes a first display device, a second display device, an image sensor, and a calibration circuit. The first display device can display the warped second image frame. The second display device can display the modified frame in the first image sequence. The image sensor can capture the displayed warped second image frame and the displayed modified frame as a captured second image frame and a captured first image frame. The calibration circuit can determine a set of transformation vectors based on a spatial difference between the alignment image data in the captured second image frame and the captured first image frame. The processor device is adapted for updating the stored transformation data with the set of transformation vectors to produce updated transformation data and for spatially aligning a displayed first image of the first image sequence and a displayed second image of the second image sequence using the updated transformation data.

At least one feature includes the image sensor adapted for being synchronized for capturing the displayed warped second image frame and the displayed modified frame.

At least one feature includes the image sensor being a camera.

At least one feature includes the first image sequence and the second image sequence being stereographic image sequences.

These illustrative aspects and features are mentioned not to limit or define the invention, but to provide examples to aid understanding of the inventive concepts disclosed in this disclosure. Other aspects, advantages, and features of the present invention will become apparent after review of the entire disclosure.

BRIEF DESCRIPTION OF THE DRAWINGS

FIG. 6 shows an example of a sensed image according to one aspect of the present invention.

FIG. 8 shows an example of an excerpt of a text file in which transformation vectors can be stored according to one aspect of the present invention.

DETAILED DESCRIPTION

Figure 1:
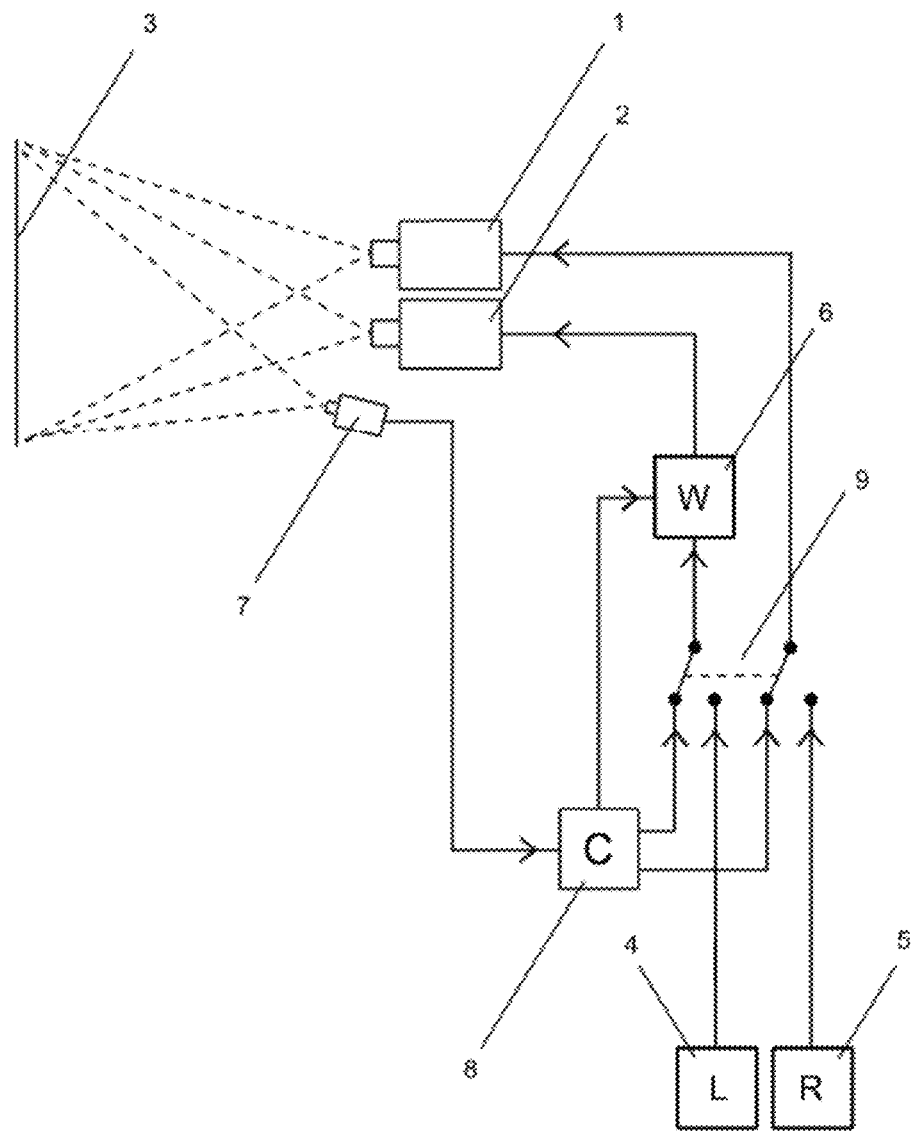
FIG. 1 shows a prior art configuration of a projection system.
Figure 2:
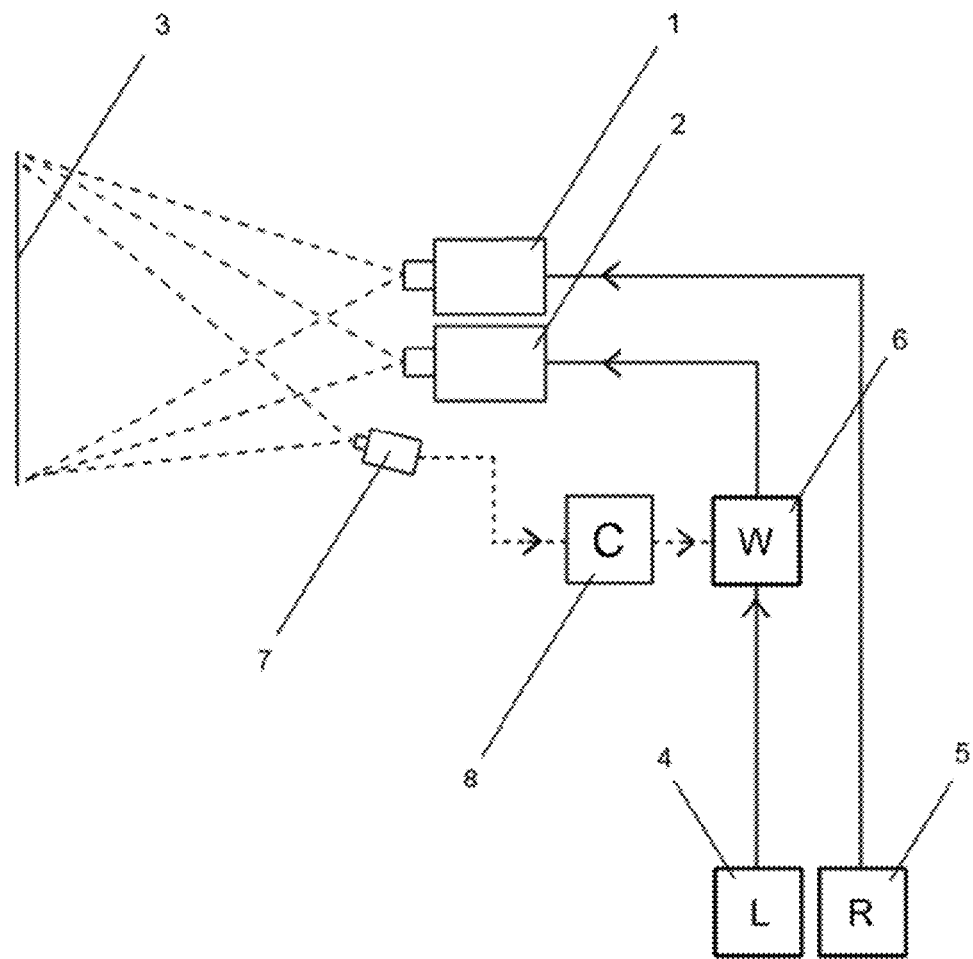
FIG. 2 shows a projection system configuration according to one aspect of the present invention.

FIG. 2 depicts on aspect of a projection system in which the solid, arrowed lines are image signal paths. A first projector 1 can project a first image sequence such as a right eye presentation image onto a projection surface 3 and a second projector 2 can project a second image sequence such as a left eye presentation image onto the projection surface 3. In a two-dimensional (2D) system, the first and second images may be fully or partially superimposed for a brighter picture or larger picture. For a dual projector 2D presentation with fully or partially superimposed images, an image sequence can be used to create a first and a second image sequence for a first and second projector. In a three-dimensional (3D) system, a 3D image sequence can be a first image sequence and a second image sequence for a right eye image sequence and a left eye image sequence respectively for a stereoscopic image sequence. In the description below the first image sequence relates to the right eye image and the second image sequence relates to the left eye image, but the system and process described can be used for a dual projector 2D presentation system.

A left image generator 4 can output a digital representation of the left eye perspective image and a right image generator 5 can output a digital representation of the right eye perspective image. The left image generator 4 and the right image generator 5 may be synchronized media servers or digital cinema servers or they may be part of an integrated stereoscopic media- or cinema server. The output of the right image generator 5 can be connected to the input of the first projector 1. The output of the left image generator 4 can be connected to a warping system 6. The warping system can have a processor, or sometimes referred to as a warping processor or warping circuit, capable of modifying the geometry of the digital image based on stored geometry transformation data and capable of modifying the stored geometry transformation data based on a set of transformation vectors being input to warping system 6. The stored transformation data in the warping processor can be the output of the warping circuit 6 that can be connected to the input of the second projector 2. The warping system 6 may be an OpenWarp2 system from company EyeVis or the Warp™ system embedded in a projector from company Barco.

In one implementation, the right image generator 5 or right server can store in memory a reference right image. The left image generator 4 or left server can store in memory a reference left image. The servers can store a reference alignment image, "R," which can have alignment data that includes an alignment pattern that has alignment features. The servers can have a processor to calculate the reference right and left images from the reference alignment image R. The reference right image may be calculated by modifying the reference alignment image R by setting all pixels in a second color channel of R to black and having the alignment data in a third color channel of R. The alignment data can be a monochromatic alignment image A. The reference left image may be calculated by modifying the reference alignment image R by setting all pixels in the third color channel of R to black and having the alignment data in the second color channel. The reference image R can include a monochrome alignment image, "A," in the second color channel which can be an identical image in the third color channel.

The reference alignment image R may further include a trigger symbol that includes at least one easily recognizable shape, for example a text or a geometric symbol, in a first color channel. The left image generator 4 and the right image generator 5 may be able to output the reference left image and the reference right image at pre-determined times and in pre-determined durations during a presentation, for example just before the start of a moving picture in a duration of $\frac{1}{24}^{th}$ a second. Alternatively or additionally, the servers may be able to output the reference left image and the reference right image when a trigger signal from an operator or an automation system is received.

Camera 7 may be a color camera capable of sensing images projected onto the projection surface 3 and outputting a sensed image, "S," at regular intervals, for example 30 times per second, to the calibration circuit 8. Alternatively, camera 7 may sense and output S when it receives a trigger signal from an operator, an automation system or the calibration circuit 8. In other aspects, a video camera or a webcam may be configured with a pattern recognition operation capable of sending a trigger signal to the camera 7 when the trigger symbol is detected on the projection screen 3. The camera 7 may be a high resolution video camera, for example a machine vision HD camera or a super high resolution video camera such as a Red One, or it may be a still image camera with external trigger capability, for example a Canon EOS 550, which may have a "pre-shoot" function capable of recording images continuously and outputting an image recorded before triggered, thereby allowing a period of time to elapse from the trigger symbol is present to the Camera 7 is triggered.

In one implementation as described above, a whole frame of one color channel of the left or right reference image can have all the reference alignment data for one projector and a whole color frame of another channel can have all the alignment data for the second projector. For a fast alignment, each of the color frames with the alignment data can be displayed for one frame period in which a camera senses and captures the image frames with the alignment data.

In another implementation, instead of having all the alignment data inserted within the presentation sequence as one whole frame, the left and right server can modify the presentation image such that only a portion of the alignment data, such as an alignment feature bordered with black pixels, replaces a corresponding portion of the presentation image for one frame period in each image sequence associated with each projector. Modifying a frame of image presentation for one color channel can be performed, such as if the image presentation data is in an red green blue (RGB) format. However, it may be possible to modify all color channels associated with one frame for the same alignment feature. By modifying subsequent frames in the same manner for different portions of the alignment data, for the different alignment features all portions of the alignment data with alignment features after an amount of time can be displayed, sensed, and captured by the camera for each projector. By dividing the alignment data into smaller portions and only showing the portions in which there is the alignment feature surrounded by an area of black pixels, the influence that the alignment data may have on the presentation content can be minimized. Having the black pixels in each portion of the alignment data that is being displayed can allow for easier detection and separation of the alignment data from the presentation image data.

To further minimize the influence of the alignment data within the presentation image from being noticeable by a viewer, the average brightness of the alignment data inserted into the presentation data can have an image brightness average that is similar to the portion of the image presentation being replaced with the alignment data. Another way to minimize the influence is to have the alignment data have the same average color as the portion of the presentation image it replaces. The influence can be further reduced by using higher frame rates such that a frame of alignment data is displayed for a shorter period, which can further reduce visibility of the alignment data by the audience. If the frame rate is high enough, the length of time a single frame is displayed can be below human visual perceptibility. Another way to reduce the influence of the alignment data is to randomly display the different features of the alignment image so as not to have any type of repetitive temporal pattern that might be recognizable by a viewer. The alignment data can be minimized in detail and reduced in size to facilitate certain types of spatial alignment to further minimize or eliminate perceptibility. For example, global vertical or horizontal image shifts one alignment dot for the first and second image sequence may be used. For rotational alignment, at least two alignment dots may be used. The alignment dots can be positioned towards the outer extremities of the image.

When a presentation image frame is modified to include data that is not presentation image content data, the image frame can be referred to as a watermarked image frame. Watermarked frames can have encoded information that is not visible by a viewer. However, watermarking can also be implemented such that the encoded information has low perceptibility in which some visually keen viewers may notice the image frame has been watermarked yet other viewers may not notice an image frame has been watermarked. When a viewer is not able to visibly see a watermarked frame, the watermarked frame can be an invisible watermarked frame. When it is possible for a viewer to see a watermarked frame, the watermarked frame may be a visible watermarked frame.

In another implementation, the alignment data or a feature of the alignment data can be encoded into the presentation image data by slightly modifying the image data pixel values. For example, the image pixels values can be slightly brighter or slightly darker based on the alignment data. This approach can lead to watermarked frames being less visible and possibly invisible to all viewers. In this type of encoding, there may be no black pixels around the alignment data to facilitate easy extraction of the alignment data. The extraction of the alignment data from slightly modified image pixels can become more difficult. The encoding of the alignment data into the image data can be performed by a processor within the server to generate the modified reference image frames within the image sequence. Displayed watermarked images can be viewed by an image sensor such as a camera 7. The camera can be triggered to capture the watermarked images and the calibration circuit 8 can store the watermarked images with the alignment data. The calibration circuit 8 can perform an additional process that extracts the alignment data from the watermarked images. The process of extracting the alignment data from the watermarked image can involve using the original image of the frame prior to being modified with a watermark. In this situation, the processor that performs the extraction can receive the original image and compare the differences with the watermarked image that corresponds with the received original image before being watermarked. The differences can include the alignment data. The watermarking used can communicate spatial alignment information. For example, watermarking using spatial encoding methods or time domain encoding methods can communicate alignment data through watermarking. Watermarking by methods of modifying the frequency domain of the image content may not be suitable for encoding spatial alignment information and may not be used for communicating spatial image alignment data.

In some aspects, the trigger signal may be a specific image/symbol on one color channel or the trigger signal may be the portion of the alignment data or a watermarked image. For example, the alignment data may have a specific spatial profile and/or light distribution profile.

The calibration circuit 8 in the projection system of FIG. 2 can have a processor and a memory unit. The memory can store a copy of the reference alignment image R. When the calibration circuit 8 detects the presence of the trigger symbol in the sensed image S, a calibration can be initiated and the calibration circuit processor can compare S to the reference alignment image R, calculate a set Vp of projection alignment transformation vectors, send Vp to the warping system 6, and signal that a set of valid alignment transformation vectors is present, initiating the warping system 6 to update the stored geometry transformation data. Alternatively, a calibration may be initiated by a trigger signal from an operator or an automation system and the trigger symbol may be omitted.

An alignment method may be based on a whole frame in which the second color channel of the first projected image has all the alignment data and the third color channel of the second projector has the all alignment data and the first color channel has the trigger image. Methods can be applied to alignment data in which alignment features are distributed over a number of image presentation frames to achieve alignment between two displayed image sequences.

Figure 3:
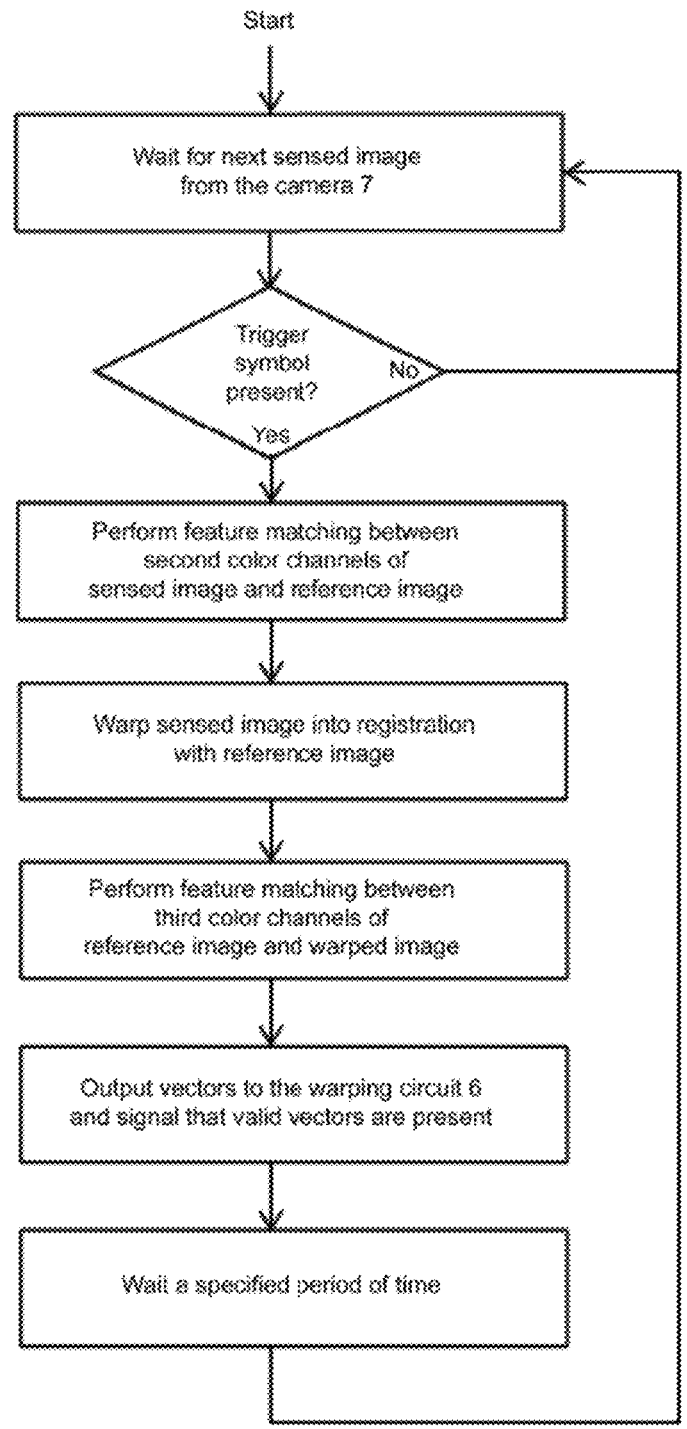
FIG. 3 shows a flowchart of the operation of a calibration circuit of a projection system according to one aspect of the present invention.

FIG. 3 shows a flowchart of an example of the operation of the calibration circuit 8 when the alignment data is encoded on one color channel of one frame in each image sequence. When the calibration circuit receives a sensed image S from the camera 7 it can examine if the trigger symbol is present in the sensed image S. When a sensed image S with the trigger symbol present is received, the calibration circuit can copy the contents of the second color channel of S to all color channels of a source input image (Is) for a feature matching operation and copying the second color channel of reference alignment image R to all color channels of a target input image (It) for a feature matching operation. It can contain the alignment image A and Is can contain the alignment image A after projection by the second projector 2 and being sensed by the camera 7. A feature matching operation can be performed with Is and It as inputs and a set V of vectors can be calculated so V describes a transformation that will bring the alignment features of Is into alignment with the corresponding alignment features of It. V can be copied to a first set V1 of transformation vectors. Feature matching may for example be performed as specified in the Scale Invariant Feature Transform algorithm or by the operation specified below in this text. In the next step, a registered version of S (Sr) can be calculated by the warping processor by warping S using the first set of transformation vectors V1, so the alignment features in the second color channel of S is now in registration with the features in the second color channel of alignment features of reference alignment image R. The next step involving the calibration circuit can include copying the third color channel of reference alignment image R to all color channels of Is and the third color channel of Sr into all color channels of It and again performing a feature matching operation updating the set of vectors V. V can be copied to a second set V2 of transformation vectors. V2 can represent a transformation that can bring the features in the third color channel of R into registration with the features of the third color channel of Sr, and represents a transformation of the reference left image that can bring the projection of the reference left image into alignment with the projection of the reference right image. V2 can be copied to Vp and Vp may then be rescaled so the source and target points refer to an image in which (X,Y)=(0,0) refers to the lower right corner and (X,Y)=(1,1) refers to the upper left corner, i.e. all X coordinates of the members of Vp are divided by the width of R and all Y coordinates of the members are divided by the height of R. The rescaling can result in the set of projection transformation vectors Vp being independent of the reference alignment image R and Vp being compatible with commercially available warping systems. Further, if the warping circuit 6 requires a regular pattern of vectors as input, additional members may be added to Vp by interpolating between the other members of Vp. Vp can then be outputted to the warping circuit 6 and the calibration circuit 8 can signal to the warping circuit 6 that a valid set of transformation vectors is present.

In an implementation in which a portion of the alignment image A bordered with black pixels replaces the corresponding portion of the presentation image, the alignment data can be identified, extracted, and used in the feature matching operation with the corresponding portion of the reference alignment image A. When all portions of the alignment image have been sensed and captured, then a complete feature matching operation of the captured portions of the alignment image with the corresponding portion of the reference alignment image A can be performed in the calibration circuit.

The alignment image A may include a grid or a pattern. In one aspect, the alignment image includes a pattern P that has a number of dots arranged into at least one pattern element E optimized for feature detection and matching, and the feature detection and matching can be performed by an algorithm optimized for the pattern P. The first color channel of the alignment image A may include the trigger symbol. The second color channel may include the pattern P. The content of the third color channel may be identical to the content of the second color channel.

Figure 4:
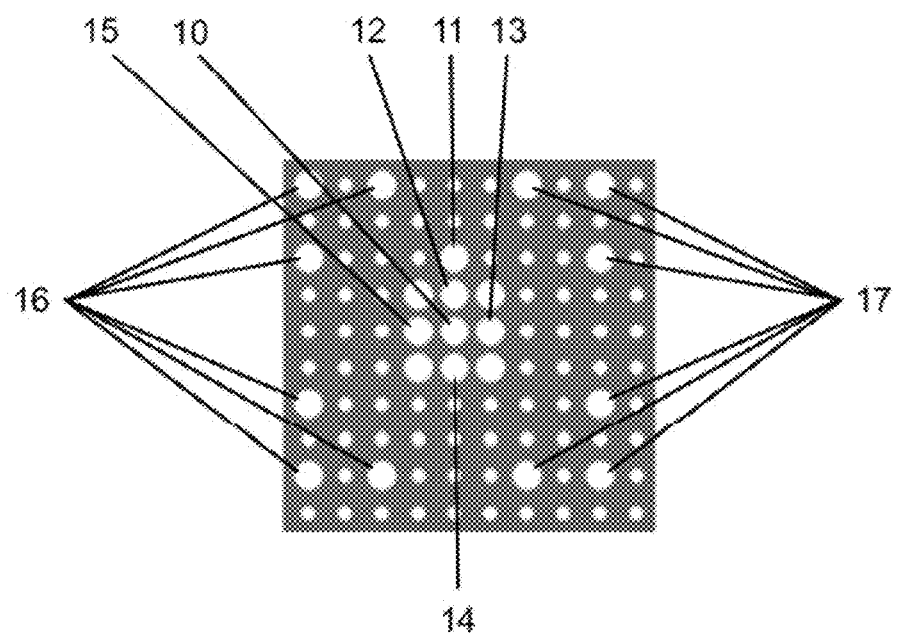
FIG. 4 shows an example of an alignment image element according to one aspect of the present invention.

FIG. 4 shows an example of an image element E that enables simple, precise and fast feature detection and matching which is robust towards rotation, scaling, distortion, noise and occlusions. A number of dots are arranged in a pattern of 10×10 equal horizontally and vertically spaced dots. The dots can be either small or big and the distribution of small and big dots varies with the position of the element E within P, but the dot positions do not vary. In all elements in P, a central dot, the anchor dot 10, is large and has more neighboring dots which are also large dots than any other dot in the element. The anchor dot 10 can be used to identify a first point in an element. The orientation dot 11 can be used to identify the orientation of an element with respect to the pattern P. The up dot 12, right dot 13, down dot 14 and left dot 15 can be used to calculate vectors for searching for the rest of the dots in the element E. A first set of dots 16 may be used to label the element E with an element column number and a second set of dots 17 may be used to label the element E with an element row number. The first set of dots 16 and the second set of dots 17 may each present a binary coded number where small dots represent the digit zero and large dots represent the number one. The members of the first set of dots 16 and the members of the second set of dots 17 are not located adjacently. This arrangement can ensure that only the anchor dot 10 has more neighboring big dots than any other dot in any instance of the element E. A dot column number, indicating a column of dots in the pattern P, can be calculated for the anchor dot 10 by multiplying the element column number by ten. A dot row number, indicating a row of dots in the pattern P, can be calculated for the anchor dot 10 by multiplying the element row number by ten. Dot column numbers and dot row numbers may be calculated for the rest of the dots in an instance of the element E by adding the column and row positions of the dot relative to the anchor dot 10 in the instance of the element E to the element column number and the element row number respectively.

Figure 5:
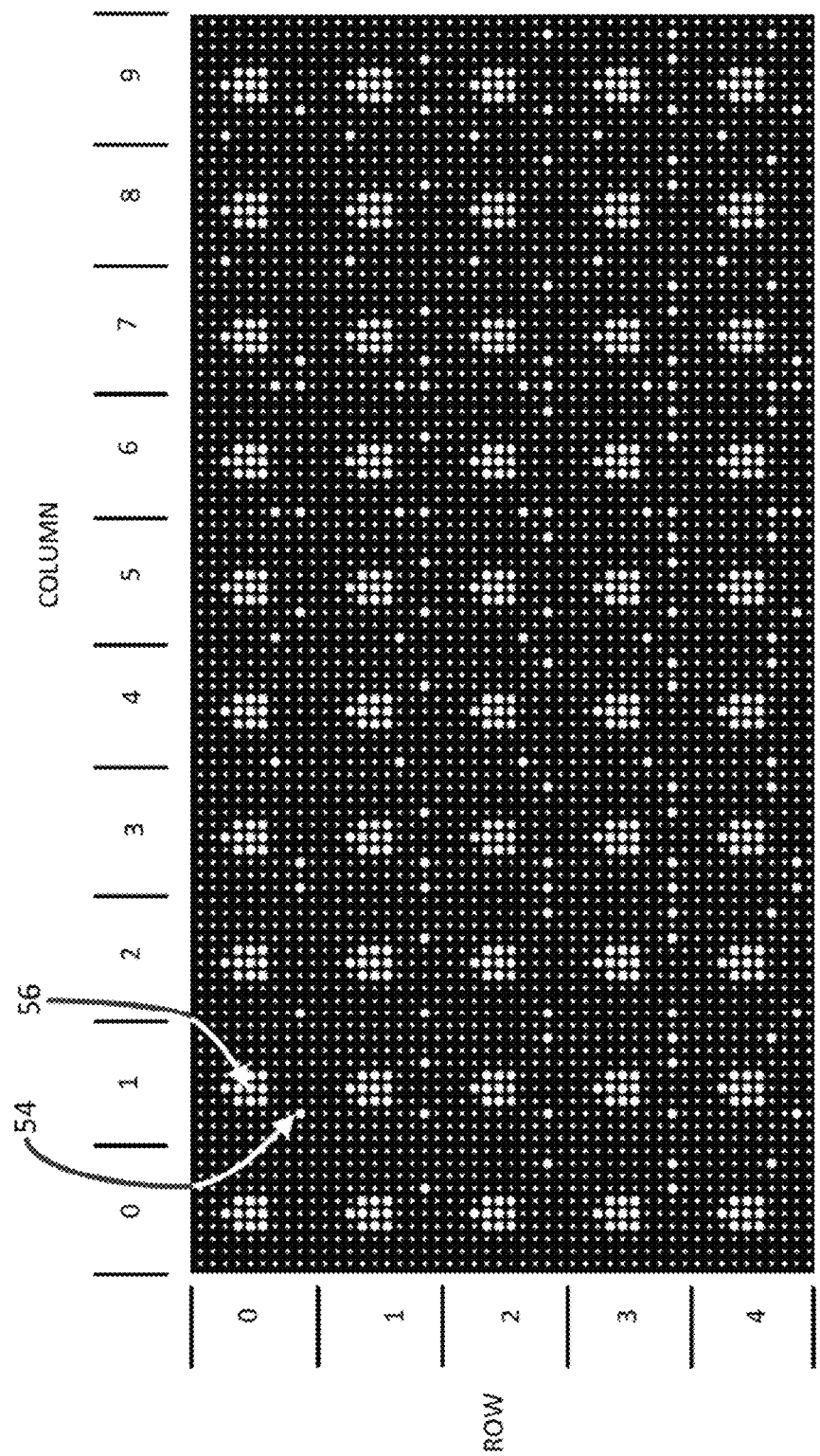
FIG. 5 shows an example of a pattern for alignment according to one aspect of the present invention.

FIG. 5 shows an example of the pattern P that includes fifty elements arranged in ten columns and five rows. The columns are numbered from zero to the last column, which in this example is nine. The rows are numbered from zero to the last row, which in this example is four. Each instance in P of the element E is labeled with an element column number by a binary number encoded by the distribution of small and big dots in the first set of dots and an element row number encoded by a binary number encoded by the distribution of small and big dots in the first set of dots. In one example the element E in column 1 and row 0 of FIG. 5 has one large dot 54 from the set of large dots 16 in FIG. 4 associated with the center large dot 56 in element E that represents the column number, in this case 1. Since the element E is in the row 0 there are no large dots from the set of large dots 17 in FIG. 4 associated with the center large dot 56 indicating a row number of 0. The column and row of each element E in FIG. 5 can be uniquely identified using the set of dots 16 in FIG. 4 to identify the column for an element and using the set of dots 17 in FIG. 4 to identify in which row for an element.

FIG. 6 shows an example of a sensed image S. The three images in the figure show the first, second and third color channel of the sensed image respectively. The first color channel contains the trigger symbol originating from the first channel of the reference alignment image R and projected by the second projector 2, the second channel contains the pattern P originating from the second channel of the reference alignment image R and projected by the second projector 2 and the third channel contains the pattern P originating from the third channel of the reference alignment image R and projected by the first projector 1.

The feature matching operation may include copying Is to an input image (I), performing a feature detection operation which calculates a table CP of control point positions in I and a boolean valid-flag for each entry indicating if the entry holds valid control point positions, copying CP to a table SCP of source control point positions, copying It to I, performing the feature detection operation again, updating the table CP of control point positions in I and the valid-flags, then copying CP to a table TCP of target control point positions. The matched features may be the dots in the pattern P and the feature matching operation may arrange the entries in the table CP according to the calculated dot column numbers and dot row numbers. A set of transformation vectors V may be calculated by iterating through the entries of SCP and the corresponding entries in TCP and if both the valid-flag in the entry of SCP is true and the valid-flag in the entry of TCP is true, then calculating the vector from the position stored in the current entry of SCP to the position stored in the corresponding entry in TCP. A feature matching operation according to some aspects may include the following sixteen steps:

Step 1: Set all pixel values in a control point image C to an initial value of black.

Step 2: Create a binary mask from a color channel of I for example by thresholding with a threshold T which may be 25% gray. Alternatively, other segmentation methods, such as region growing, K-means segmentation or histogram based segmentation, may be used. Normalizing, mean or median filtering or other type of filtering may be included in the segmentation. Normalizing may include scaling pixel values between values of corresponding pixels in a blackpoint image and a whitepoint image, where the blackpoint image is calculated as an eroded version of I and the whitepoint image is calculated as a dilated version of I.

Step 3: Multiply the binary mask with a color channel of I and put the result in a grayscale image.

Step 4: Iterate through pixels in the grayscale image. For every pixel performing a region growing with the current pixel as seed point, identifying a set of pixels. The region growing may be performed by iterating recursively through all connected, non-black pixels in a Moore-neighborhood. The set of pixels can then, with a high probability, contain one and only one dot. The center of the dot (Xc,Yc) can be calculated with a precision of $1/256^{th}$ of a pixel as the center of gravity of the set of pixels. That is, Xc is the weighted mean X position of all pixels in the set of pixels and Yc is the weighted mean Y position of all pixels in the set of pixels, where the weights are the pixel values of the corresponding pixels. The diameter D of the dot can be calculated with a precision of one pixel as D=2*sqrt(A/Pi), where A is the total number of pixels in the set of pixels. The nearest neighbor (Xn,Yn) to (Xc,Yc) can be found by truncating Xc and Yc. The pixel in C corresponding to the nearest neighbor (Xn,Yn) can be set to a color value (Pr,Pg,Pb), where Pg=128+D, Pr is calculated as the $1/256^{th}$ sub-pixel offset in the horizontal direction, Pr=(Xc−Xn)*256 and Pb is calculated as the $1/256^{th}$ sub-pixel offset in the vertical direction, Pb=(Yc−Yn)*255. Then all pixels in the set of pixels can be set to black and the iteration through pixels in the grayscale image can continue.

Figure 7:
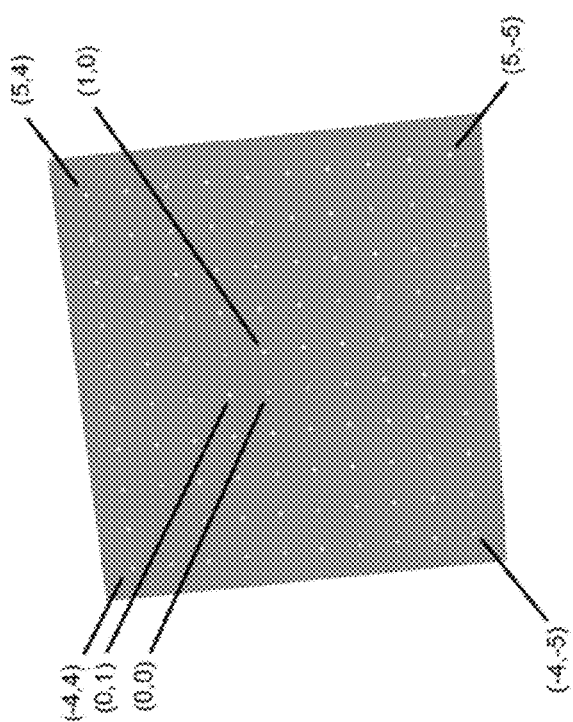
FIG. 7 shows an enlarged segment of a control point image according to one aspect of the present invention.

Step 5: The control point image C contains a black background with pixels in positions where the input image has dot centers set to a brighter color value and where the color value yields information about the dot diameter and dot center with sub-pixel. FIG. 7 shows a monochrome version of an enlarged segment in an example of the control point image C with the dot column and dot row positions relative to the anchor dot indicated. The green channel of a pixel has a value of 128 plus the diameter of the dot. The red and blue channels of a pixel hold the sub-pixel offsets in the X and Y directions with respect to the position of the pixel. An iteration through pixels in C image can be performed. If the color of the current pixel is black—meaning no dot was identified in this position—then step 5 is repeated. When a non-black pixel is found, the operation continues to step 6

Step 6: Create a neighbor list that includes positions of the twelve nearest neighboring non-black pixels sorted by Chebyshev distance from the current pixel. Nearest pixels may be pixels having the smallest Chebyshev distance. This step may be executed by iterating through pixels surrounding the current pixel with increasing Chebyshev distance from the current pixel.

Step 7: Calculate a dot discriminator threshold value T by creating a green-value list that includes the green channel pixel values of the pixels in the neighbor list, sorted by the green channel pixel values. The entry in the green-value list is identified where the increase in value from the previous entry is biggest and T is set to the mean of the value of the identified entry and the value of the previous entry. Since the neighbor list may contain pixel positions corresponding to both big and small dots when I is not extremely distorted, and since the diameter D of the dots is encoded in the green channel, the calculated T can be used to determine if the dot corresponding to an entry in the neighbor list is big or small.

Step 8: Determine if the dot corresponding to the current pixel is an anchor dot by examining if the seven nearest neighboring dots of the dot corresponding to the current pixel are all big dots. This may be performed by examining if the pixels corresponding to the first seven entries in the neighbor list have all green channel values greater than T. When I is not extremely distorted, this may only be true for an anchor dot. If the dot corresponding to the current pixel is an anchor dot, then continue to step 9. Otherwise, go to step 5 and continue with the next pixel in the iteration through pixels in C.

Step 9: Calculate the position of the anchor dot, i.e. the position in the input image of the dot corresponding to the current pixel. The position can be stored in entry DT(0,0) of a two-dimensional table DT of dot positions (X,Y), where X and Y are stored with precisions of at least $\frac{1}{256}^{th}$ of a pixel width and a valid-flag, which is a boolean operator indicating if X and Y hold valid values, and where DT has indices Xdt,Ydt, where −4<Xdt<5 and −5<Ydt<4. The position in the input image of the dot corresponding to the current pixel can be stored as follows: X is set to the horizontal position of the current pixel in the input image plus the value of the red color channel of the current pixel divided by 256 and Y is set to the vertical position of the current pixel in the input image plus the value of the blue color channel of the current pixel divided by 256, refer to step 4, where the sub-pixel position information was stored in the red and blue channels, and the valid-flag in DT(0,0) is set to true. The valid-flags of all other entries in DT are initialized to false.

Step 10: Calculate the position of the up dot 12 and store it in DT(0,1). Referring to FIG. 3, the up dot 12 can be the only neighboring dot to the anchor dot, for which it is true that the dot positioned in the direction from the anchor dot to the neighboring dot and at two times the distance from the anchor dot to the neighboring dot is also a large dot. This characteristic can be used to identify the up dot located in the same element in I as the anchor dot. This may be done by iterating through the first eight entries in the neighbor list, for each entry in the neighbor list calculating a position Pu in I, which is in the direction from the position of the anchor dot DT(0,0) to the position stored in the current entry in the neighbor list and at two times the distance from the position of the anchor dot DT(0,0) to the position stored in the current entry in the neighbor list. Search in I for the nearest non-black pixel to Pu within a search radius r, which may be 25% of the distance from DT(0,0) to Pu. If the nearest non-black pixel corresponds to a large dot, which may be determined by examining if the green channel value of the nearest pixel is greater than T, then the pixel in the position of the current entry in the neighbor list corresponds to the up dot 12 and the position of the dot corresponding to the pixel in the position at the current entry in the neighbor list is stored in DT(0,1) in the same way a position was stored in step 9. If a value was successfully stored in DT(0,1), then continue with step 11. Otherwise, go to step 5 and continue with the next pixel in the iteration through pixels in C.

Step 11: Calculate the position of the left dot and store it in DT(1,0). This may be performed as follows: a first vector Vu is calculated as the vector that points from the position stored in DT(0,0) to DT(0,1) and a second vector Vu' is calculated as a ninety degrees clockwise rotated of V. A position PI is calculated as DT(0,0)+Vu'. A search is performed in I for the nearest non-black pixel to the position PI within the search radius r, and the position of the dot corresponding to the nearest non-black pixel is stored in DT(1,0) in the same way a position was stored in step 9. DT(1,0) then holds the position of the left dot, provided I has not been distorted so much, that the dot below or the dot above has become closer to PI than the left dot. To enhance robustness towards distortion, it may be checked if the left dot was actually found. This may done as follows: First, it is checked if the nearest non-black pixel to a position calculated as DT(1,0)+Vu has a green channel value smaller than T. If this is the case, the corresponding dot is a small dot, meaning the position assigned to DT(1,0) actually was the position of the neighboring dot to the left dot in the upwards direction and DT(1,0) may be recalculated this way: the position of the corresponding dot to the nearest non-black pixel to the position DT(1,0)−Vu is stored in DT(1,0), again in the same way a position was stored in step 9. Then, it may be checked if the nearest non-black pixel to a position calculated as DT(1,0)−Vu has a green channel value smaller than T. If this is the case, the corresponding dot is a small dot, meaning the position assigned to DT(1,0) actually was the position of the neighboring dot to the Left dot in the downwards direction and DT(1,0) may be recalculated this way: the position of the corresponding dot to the nearest non-black pixel to the position DT(1,0)+Vu is stored in DT(1,0), again in the same way a position was stored in step 9. If a value was successfully stored in DT(1,0) then continue with step 12. Otherwise, go to step 5 and continue with the next pixel in the iteration through pixels in C.

Step 12: Calculate and store the positions of the down dot and the right dot. The position of the down dot can be calculated as DT(0,0)−Vu and stored in DT(0,−1) in the same way a position was stored in step 9. The position of the right dot can be calculated as DT(0,0)−Vu' and stored in DT(−1,0) in the same way a position was stored in step 9.

Step 13: Calculate and store the positions of the rest of the dots in the element. With the positions of the anchor dot, the up dot, the down dot, the left dot and the right dot now all being calculated, the positions of these dots can be used to calculate new search positions in the element and search for non-black pixels and store their positions in DT. For example, the position of the dot corresponding to DT(2,0) can be found in a calculation that includes finding the nearest neighboring non-black pixel to a position calculated as DT(1,0)+V within the search radius r, where V is the vector pointing from the position stored in DT(0,0) to the position stored in DT(1,0). When the found dot position is stored successfully in DT(2,0), which can be ascertained by examining if the valid-flag is set to "true", then DT(3,0) can be found in a similar calculation that includes finding the nearest non-black neighboring pixel to a position calculated as DT(2,0)+V within the search radius r, where V is the vector pointing from DT(1,0) to DT(2,0), and so on, tabulating from the anchor dot in the up and down directions and left and right directions until as many positions of the dots in the element has been stored in DT.

Step 14: Calculate element column position and element row position of the instance of the element E. First, check if all the entries in DT corresponding to the set of dots denoted 16 and the set of dots denoted 17 in FIG. 3, i.e. DT(−2,4), DT(−4,4), DT(−4,2), DT(−4,−2), DT(−4,−4), DT(−2,−4), DT(2,4), DT(4,4), DT(4,2), DT(4,−2), DT (4,−4), DT(2,−4) have their valid-flags set to "true". If this is true, then the element column number may be calculated as 32*DT(−2, 4)+16*DT(−4,−4)+8*DT(−4,2)+4*DT(4,−2)+2*DT(4,4)+DT(−2,−4) and the element row number may be calculated as 32*DT(2,4)+16*DT(4,4)+8*DT(4,2)+4*DT(4,−2)+

2*DT (4,−4)+DT(2,−4). Otherwise set the valid-flag of all entries in DT to "false" and go to step 5 and continue with the next pixel in the iteration through pixels in C.

Step 15: Copy the stored positions and valid-flags in DT to the table CP. An iteration can be performed through all combinations of i,j, where 1<=i<=10 and 1<=j<=10 and the information stored in DT(i−5,j−6), that includes positions and valid-flag, is copied to CP(i,j).

Step 16: If the iteration through pixels in C is not finished, go to step 5 and continue with iteration through pixels in C. Otherwise the analysis of I is finished and all the dot position information the system was able to gather from the input image I is now stored in the table CP.

One advantage of storing the control points temporarily in the control point image C that may be realized in some aspects is that the C may be made available for inspection with an image analyzing software and be a useful tool during installation, service, and debugging of the system.

The set of projection transformation vectors Vp may be stored as a text file which may be transferred to the warping circuit 6 for example as a shared file on a network drive or by an RS232 connection. The text file may store one vector per line of the text file as four values represented as floating point numbers: source X, source Y, target X, target Y. FIG. 8 shows an example of an excerpt of the text file. For example, FIG. 8 shows an example of an excerpt output format for the set of projection transformation vectors Vp, where Vp is formatted as floating point numbers in a text file arranged with four values in each row: source X, source Y, target X, target Y.

The process to perform an alignment as described above involves determining transformation vectors between the first and second projected alignment image relative to a reference alignment image R. In an alternate approach, the alignment process can be modified such that the transformation vectors between the first and second projected images are determined based on the difference in position of the alignment data features of the captured projected first and second alignment image. Instead of using a reference alignment image, the alignment can be performed on a relative basis between the first and second projected alignment image, achieving the same result as the process that involves comparing to a reference alignment image R.

Figure 9:
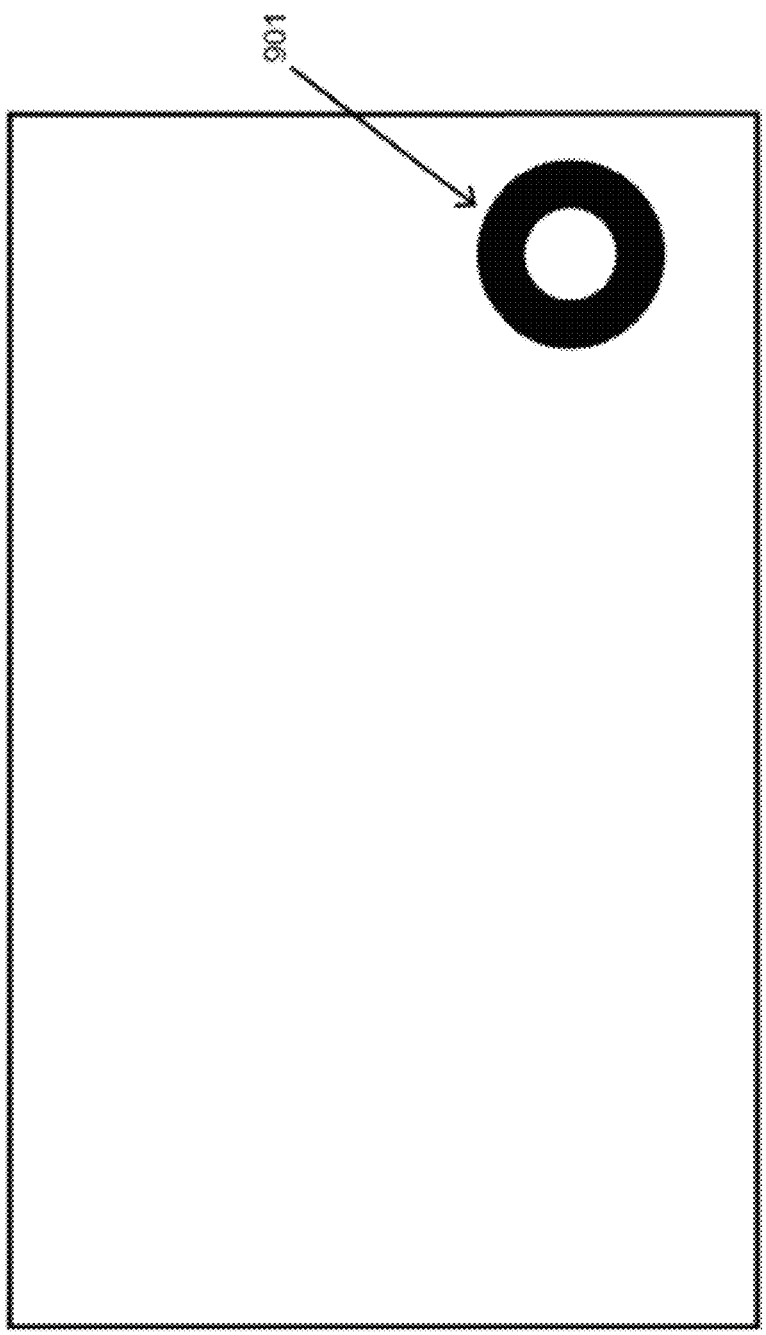
FIG. 9 shows an alignment pattern usable for determining modifications to warping transformation vectors according to one aspect of the present invention.
Figure 10:
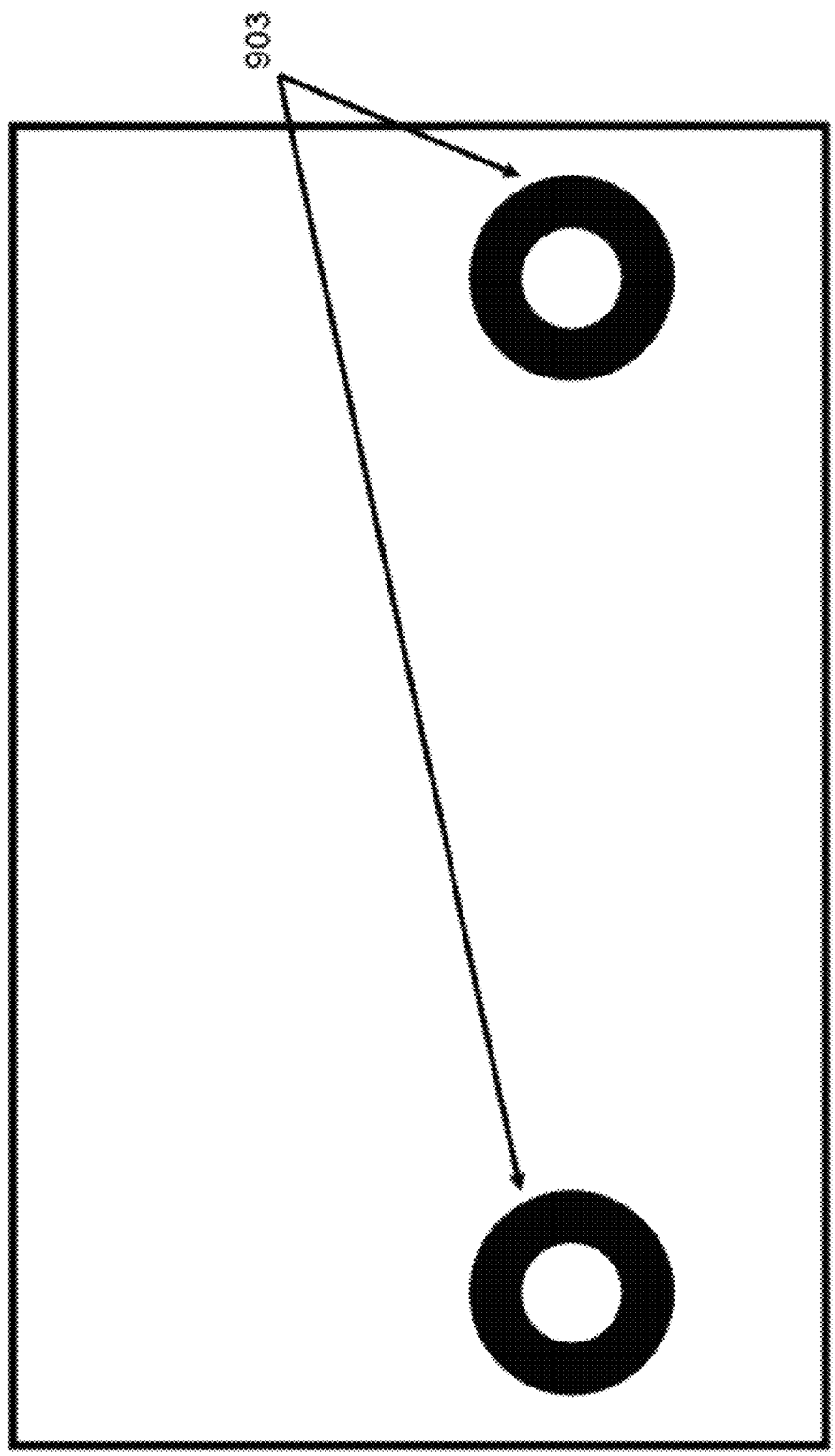
FIG. 10 shows an alignment pattern usable for determining modifications to warping transformation vectors according to a second aspect of the present invention.

A system configured as FIG. 2 can be calibrated before a day of presenting shows in which the calibration relates to local and global alignment between the first and second image sequence. During the day, any misalignment that occurs can involve global alignment adjustments and the adjustments may be relatively small. A simplified alignment pattern as shown in FIGS. 9 and 10 can be used to determine modifications to the warping transformation vectors that keep the display images in alignment. In FIG. 9, there is one alignment dot with a black border 901 that can be used in a first and second image sequence for a simple vertical and horizontal alignment process. In FIG. 10, there are two alignment dots with a black border 903 that can be used in a first and second image sequence for a simple rotational alignment process. These dots can be configured to have a Gaussian illumination distribution as one way the calibration circuit is able to determine the position of the centroid of each dot with sub-pixel accuracy. With the centroid position for each alignment dot in the first and second projected image, the differences relative to the positions of the corresponding centroid dots in the reference alignment image can be calculated and the transformation vectors that bring the first and second image into alignment with sub-pixel accuracy can be determined. With this system, a lower resolution camera to capture the displayed modified image sequence can be used. From the alignment pattern of FIGS. 9 and 10, it may be possible to determine the vertical, horizontal and rotational shift between the two displayed images.

In another aspect, modifying an image frame of an image sequence includes modifying the blue channel image content of the frame or a portion of the frame to be blurred, for example with a Gaussian blur r=0.1% of image width. The blue channel image content or the portion of the blue channel image content can also be modified with an alignment feature having high frequency components. The displayed image can be based on the modified blue channel image frame in which the camera 7 in FIG. 2 is configured to only capture the blue channel information. When the captured image is high frequency filtered by the calibration circuit 8, the alignment feature can be determined. The determined alignment feature can be used by the calibration circuit 8 to determine the transformation vectors that can be used by the warping processor 6 for image realignment.

Figure 11:
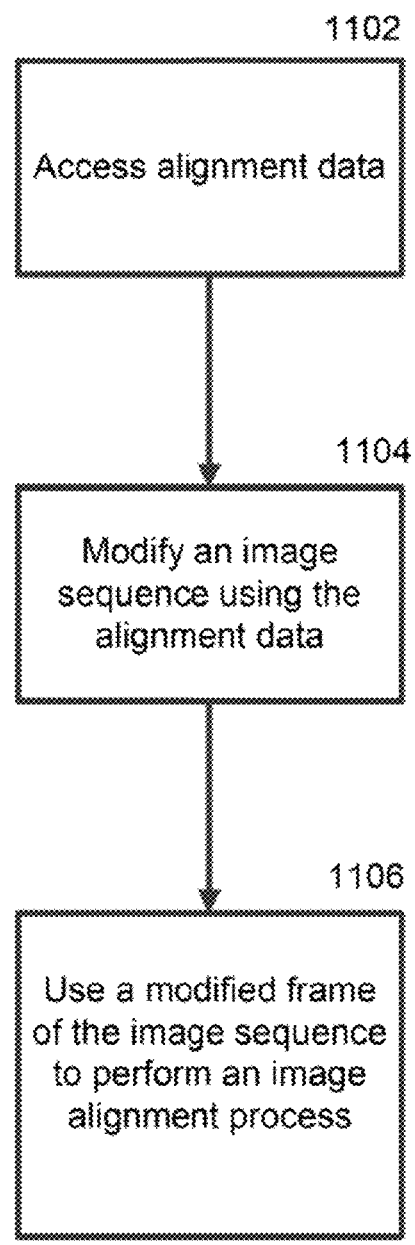
FIG. 11 shows a flow diagram for spatially aligning image sequences according to one aspect of the present invention.

FIG. 11 depicts a process according to one aspect for modifying a presentation image sequence with an alignment image feature. The process in FIG. 11 can be implement using a projection system, such as the system shown in FIG. 2.

In block 1102, alignment data is accessed. In some aspects, the alignment data may be received and stored in a memory unit in a server. For example, the system can receive the alignment data from a user by a data transfer mechanism, such as over a network or using a portable memory device, e.g. a memory stick, digital video device (DVD), or a personal computer (PC). In other aspects, the projection system can generate the alignment data. The alignment data can include an alignment pattern that has one or more features usable to align or improve alignment of two displayed image sequences that have presentation content. For example, the alignment data can be information that is independent of image presentation content such as shown in FIGS. 4-6 and 9-10. The alignment data can provide one or more features that are limited to allowing global misalignment between two image sequences to be corrected, such as is shown in FIGS. 4 and 9-10. Alignment data can also provide one or more features that can be used for correction of alignment between two image sequences within a spatial region or regions of the two image sequences. The alignment data may be one color, such as a monochromatic color. In other aspects, the alignment data is more than one color.

In block 1104, the image sequence is modified with alignment data by a processor within the projection system. The processor can be in the server or generator for example in the left or right generator (4 & 5) in FIG. 2. An image sequence, such as a presentation image sequence, can be modified using the alignment data by replacing presentation content with one or more features of the alignment image. One or more image sequences can be modified with the feature(s) of the alignment image. For example, image content in a frame or a portion of the frame of a color channel in a first image sequence can be modified with a feature from the alignment data and image content in a frame or portion of a frame in a second image sequence in another color channel can be modified with the same feature. The modified frames of the first and second image sequences can be a temporally and correspondingly displayed, the modified frames can be alternately displayed, or the modified frames of the first image sequence can be displayed sequentially followed by the modified frames of the second image sequence being displayed sequentially.

The alignment feature or features can be divided into several portions so that each sequential frame in an image sequence is modified with a portion of the alignment feature or features. The modified portions can be different for each frame. For example, the alignment feature or features can be divided among at least two or more frames in an image sequence such that all of the alignment image feature or features appears in the at least two or more frames of the modified image sequence. An image sequence can be modified such that an image frame in the image sequence has been modified to include an alignment feature or features such that the average luminance and/or color balance of the added alignment feature or features match the average luminance and/or color balance of the original image content that the alignment feature or features replaces. The image sequence can be modified such that each alignment feature is surrounded by black pixels or a blurred portion of pixels of at least one color to facilitate subsequently determining the alignment feature from the image content. Modifying an image frame with an alignment feature can be performed such that the alignment feature can be determined from the image content after the modified image has been displayed, and the alignment feature can be used for the purpose of image alignment. Modifying an image frame can also include watermarking of at least one frame of an image sequence with a feature of an alignment image such that the alignment feature can be determined from the image sequence modified with the watermarked feature has been displayed. A processor can also modify an image sequence using any combination of modifications disclosed above.

In block 1106, the modified frame of an image sequence is used by the projection system to perform an image alignment process. The alignment process can be performed by a processor within the projection system, such as the system in FIG. 2. The alignment feature or features can be determined after the modified image sequence is displayed and the determined alignment feature can be used in an alignment process that aligns an image sequence. A process as described in FIG. 3 is an example of a process for determining an alignment feature or features from a displayed modified image sequence to determine transformation vectors used in an image warping process for image alignment. Feature matching is one method to determine the alignment features, but other methods such as filtering can be used to determine alignment features in an image sequence. One potential advantage of the process of FIG. 11 may be that the image sequence is modified such that the effectiveness and efficiency of extracting alignment features from modified image sequence is improved by the way the image sequence is modified with the alignment image such that visibility of the alignment feature within the modified image sequence is below a level of being perceived by a viewer.

Figure 12:
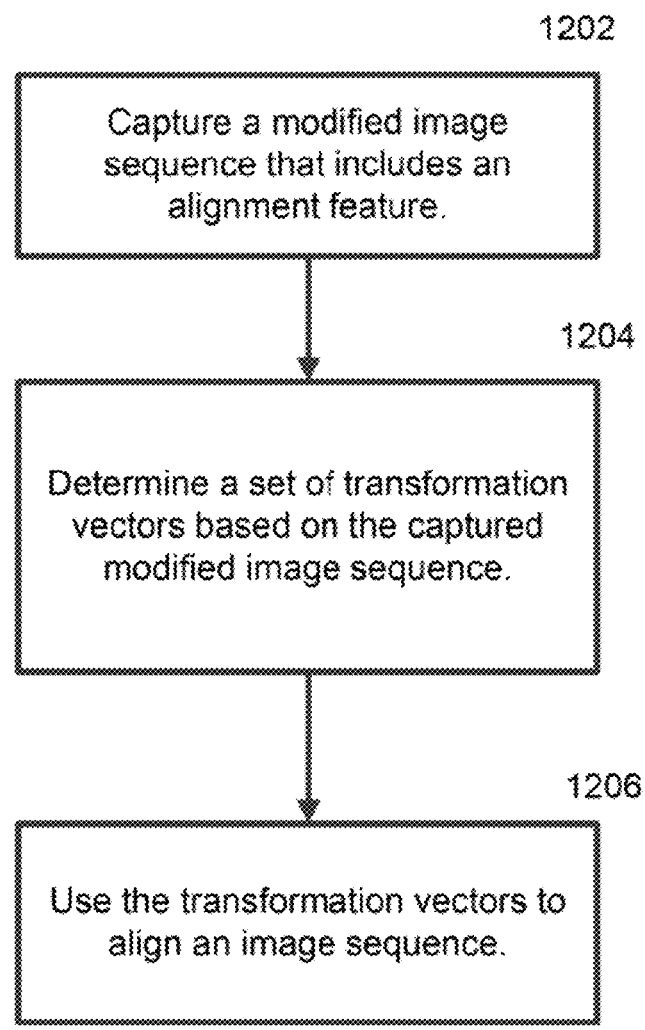
FIG. 12 shows a flow diagram for spatially aligning image sequences using transformation vectors according to one aspect of the present invention.

FIG. 12 depicts a process of aligning an image sequence using a modified image sequence according to another aspect. The process can be performed by a projection system, such as the system shown in FIG. 2.

In block 1202, a modified image sequence that includes an alignment feature is captured. The image sequence may be modified by any suitable process to include the alignment feature. An example of one process is shown in block 1104 of FIG. 11. The modified image sequence can be captured by a camera device or other type of image sensing device. The captured modified image sequence can include the image frame or frames that have been modified by the alignment feature. Although the process is described in connection with an image sequence modified with an alignment feature, more than one alignment feature can be used. The timing of the capturing of the modified image frames can be performed by using a trigger signal, such as an external trigger signal, to the capturing device or by a trigger image included in the modified image sequence. The capturing device can contain a memory unit to store the captured image frames or the capturing device can send the captured frames to a memory unit external to the capturing device.

In block 1204, a set of transformation vectors is determined based on the captured modified image sequence. In some aspects, the set of transformation vectors is determined based on the alignment feature of the captured modified image sequence. For example, the calibration circuit 8 in FIG. 2 or a processor can determine the spatial difference in the alignment feature to determine a set of transformation vectors. The calibration circuit can determine the alignment feature from the modified image frame by feature matching as described earlier. Other methods for feature matching may be used including Fourier methods for fast detection of directionality in the sensed pattern, mutual information methods and relaxation methods. Modification of the image sequence can allow other filtering methods to be used to determine the alignment feature in the modified image sequence. For example, a blue filter can be used when alignment data is the blue channel of a frame of a modified image sequence.

In block 1206, the transformation vectors of the set are used to align the image sequence. A processor in the projection system can spatially shift the image sequence using the transformation vectors in the set before the image sequence is displayed. For example, the warping processor 6 in FIG. 2 can spatially shift the second image sequence based on the valid transformation vectors received by the calibration circuit 8. The transformation vectors can be based on the spatial difference between the captured alignment feature and the reference alignment feature or the spatial difference between a captured alignment feature from a displayed first and second modified image sequence with the alignment feature.

Alignment methods according to various aspects can be applied to dual 3D projections systems and dual 2D presentation in which two or more images are stacked or superimposed to improve image brightness or when two or more projection systems are used to tile images together to cover a larger area.

While the present subject matter has been described in detail with respect to specific aspects and examples hereof, those skilled in the art, upon attaining an understanding of the foregoing may readily produce alterations to, variations of, and equivalents to such aspects and examples. Accordingly, it should be understood that the present disclosure has been presented for purposes of example rather than limitation, and does not preclude inclusion of such modifications, variations and/or additions to the present subject matter as would be readily apparent to one of ordinary skill in the art. For example, certain aspects and features are for explanatory purposes described in terms of electronic circuits and example configurations, but these circuits may be realized in the form of functions in a computer program and the scope of the invention should not be regarded as limited to these example configurations, but should include variations and alternative configurations.

What is claimed is:

1. A method comprising:
   receiving a first digital image sequence representing a visual presentation and comprising a plurality of frames that include image content;

receiving an alignment feature that is separate from the first digital image sequence and the visual presentation represented by the first digital image sequence;

generating modified frames by a processor in a projection system modifying at least some frames of the plurality of frames to represent at least part of the alignment feature but retaining part of the image content in the at least some frames that represent a portion of the visual presentation, while maintaining as unmodified with part or all of the alignment feature the image content in other frames of the plurality of frames, the modified frames being positioned in the first digital image sequence such that a first set of unmodified frames precedes the modified frames in the first digital image sequence and a second set of unmodified frames is subsequent to the modified frames in the first digital image sequence, wherein the alignment feature is divided into a plurality of alignment portions such that each modified frame is modified to include a different portion of the alignment feature in a different position of the modified frame as compared to other of the modified frames and, together, the modified frames include all of the alignment feature; and spatially aligning the first digital image sequence and a second digital image sequence, during the visual presentation, based on the modified frames in projecting the first digital image sequence by a first projector and the second digital image sequence by a second projector, to reduce an effect of spatial changes in image alignment between projected images from the first digital image sequence and the second digital image sequence during the visual presentation.

2. The method of claim 1, wherein generating the modified frames comprises modifying at least one color channel of the at least some frames using data from the part of the alignment feature.

3. The method of claim 1, wherein the different portion of the alignment feature has a random spatial sequence among the modified frames.

4. The method of claim 1, wherein generating the modified frames comprises removing a portion of each frame of the at least some frames and adding the different portion of the plurality of alignment features to replace the portion in the frame, wherein the image content of the modified frames includes black image pixels around the part of the alignment feature.

5. The method of claim 4, wherein the plurality of alignment portions has an average illumination level that substantially corresponds to the average illumination level of the portions of the modified frames that are removed.

6. The method of claim 4, wherein the plurality of alignment portions has an average color balance corresponding to the average color balance of the portions of the modified frame that are removed.

7. The method of claim 4, wherein the plurality of alignment portions has a Gaussian illumination profile.

8. The method of claim 1, further comprising:
capturing, as a captured second image sequence frame, a displayed second digital image sequence frame modified with alignment image data that comprises the alignment feature;
capturing, as a captured first image sequence frame, a displayed first digital image sequence modified with the alignment image data;
determining a set of transformation vectors based on a spatial difference between the alignment image data in the captured second image sequence frame and the alignment image data in the captured first image sequence frame; and
spatially aligning a displayed first image of the first digital image sequence and a displayed second image of the second digital image sequence using the set of transformation vectors.

9. The method of claim 1, wherein the plurality of alignment portions has content of at least one color channel, wherein the modified frames include image content pixels around the plurality of alignment portions of the alignment feature, the image content pixels being lower frequency image content of the at least one color channel than the content of the plurality of alignment portions of the alignment feature.

10. The method of claim 1, wherein generating the modified frames comprises changing pixel values of pixels in the frame based on alignment pixel values of alignment pixels in the alignment feature, the alignment pixels and the pixels having corresponding frame locations.

11. A method, comprising:
during display of a visual presentation in a theatre environment,
capturing, as captured first image sequence frames, displayed first image sequence content frames having image content modified with alignment data of an alignment feature by a projection system modifying at least some of the first image sequence content frames to represent part of the alignment feature but retaining part of the image content that represents the visual representation in the at least some of the first image sequence content frames, while maintaining as unmodified with part or all of the alignment feature the image content in other frames of the first image sequence content frames, wherein modified first image sequence content frames are positioned in the first image sequence content frames such that a first set of unmodified first image sequence content frames precedes the modified first image sequence content frames in the first image sequence content frames and a second set of unmodified first image sequence content frames is subsequent to the modified first image sequence content frames in the first image sequence content frames, wherein the alignment feature is divided into a plurality of alignment portions such that each modified first image sequence frame is modified to include a different portion of the alignment feature in a different position of the modified first image sequence frame as compared to other of the modified first image sequence frames and, together, the modified first image sequence frames include all of the alignment feature;
capturing, as captured second image sequence frames, displayed second image sequence frames having image content modified with the alignment data by the projection system modifying at least some of the second image sequence content frames to represent the part of the alignment feature but retaining the part of the image content that represents the visual representation in the at least some of the second image sequence content frames, while maintaining as unmodified with part or all of the alignment feature the image content in other frames of the second image sequence content frames, wherein modified second image sequence frames are positioned in the second image sequence frames such that a first set of unmodified second image sequence frames precedes the modified second image sequence frames in the second image sequence frames and a second set of unmodified second image sequence frames is subsequent to the modified second image sequence frames in the second image sequence frames, each modified second image sequence frame is modified to include a different portion of the alignment feature in a different position of the modified second image sequence frame as compared to other of the modified second image sequence frames and, together, the modified second image sequence frames include all of the alignment feature;

determining a set of transformation vectors based on a spatial difference between the alignment data in the captured second image sequence frames and the alignment data in the captured first image sequence frames; and spatially aligning a displayed first image of a first image sequence and a displayed second image of a second image sequence using the set of transformation vectors to reduce an effect of spatial changes in image alignment between projected images from the first image sequence and the second image sequence.

12. The method of claim 11, further comprising:

modifying image content in the first image sequence content frames and the second image sequence content frames by the projection system replacing part of the first image sequence and part of the second image sequence with the alignment data to generate the modified first image sequence frames and the modified second image sequence frames;

warping the modified second image sequence frames with stored transformation data to generate warped second image sequence frames;

displaying the warped second image sequence frames as the displayed second image sequence frames and displaying the modified first image sequence frames as the displayed first image sequence frames; and updating the stored transformation data with the set of transformation vectors to produce updated transformation data, wherein spatially aligning the displayed first image of the first image sequence and the displayed second image of the second image sequence using the set of transformation vectors comprises using the updated transformation data.

13. The method of claim 12, wherein modifying image content in the first image sequence content frames and the second image sequence content frames comprises:

accessing the alignment data comprising an alignment pattern having at least one alignment feature; and modifying a portion of image content in a frame in the first image sequence by the projection system replacing the portion of the first image sequence with the different portion of the alignment feature, wherein the first image sequence and the second image sequence each comprise digital image data, wherein spatially aligning the displayed first image of the first image sequence and the displayed second image of the second image sequence using the set of transformation vectors comprises spatially aligning the first image sequence and the second image sequence based on the portion modified by the projection system when displaying the first image sequence and the second image sequence.

14. The method of claim 12, wherein modifying the image content in the first image sequence content frames and the second image sequence content frames comprises:

accessing the alignment data comprising an alignment pattern;

modifying a first portion of image content in a frame of the first image sequence using part of the alignment pattern; and modifying, using another part of the alignment pattern, a second portion of image content in a subsequent frame of the first image sequence that is different than the first portion, wherein the frame with the first portion modified using the part of the alignment pattern and the subsequent frame with the second portion modified using another part of the alignment pattern comprise all of the alignment pattern.

15. The method of claim 12, wherein modifying the image content in the first image sequence content frames and the second image sequence content frames comprises:

watermarking the alignment data onto image data in the first image sequence and the second image sequence by one of:
  spatial encoding to watermark the alignment data onto the image data; or
  time domain encoding to watermark the alignment data onto the image data, the method further comprising:
extracting the alignment data from at least one of the captured second image sequence frames or the captured first image sequence frames by identifying the alignment data watermarked into the first image sequence or the second image sequence.

16. The method of claim 11, wherein determining the set of transformation vectors based on the spatial difference between the alignment data in the captured second image sequence frames and the captured first image sequence frames comprises:

determining a first set of transformation vectors based on a difference between the alignment data and the captured second image sequence frames including a modification using the alignment data; and determining a second set of transformation vectors based on a difference between the alignment data and the captured first image sequence frames including a modification using the alignment data, wherein spatially aligning the displayed first image of the first image sequence and the displayed second image of the second image sequence using the set of transformation vectors comprises spatially aligning the displayed first image of the first image sequence and the displayed second image of the second image sequence using the first set of transformation vectors and the second set of transformation vectors.

17. The method of claim 11, further comprising:

determining a centroid of alignment features of the captured first image sequence frames and the captured second image sequence frames using a low resolution image sensor.

18. A dual display projection system, comprising:

a server comprising:
  a memory unit for storing a first image sequence and alignment data that is an alignment pattern having at least one alignment feature and that is separate from the first image sequence, the first image sequence representing a visual presentation and comprising a plurality of frames with image content; and a processor device configured for:
  generating modified frames for the first image sequence by modifying at least some frames of the plurality of frames to represent at least part of the alignment feature but retaining part of the image content that represents a portion of the visual presentation in the frames, while maintaining as unmodified with part or all of the alignment feature the image content in other frames of the plurality of frames, the modified frames being positioned in the first image sequence such that a first set of unmodified frames precedes the modified frames in the first image sequence and a second set of unmodified frames is subsequent to the modified frames in the first image sequence, wherein the processor device is configured to divide the alignment feature into a plurality of alignment portions such that each modified frame is modified to include a different portion of the alignment feature in a different position of the modified frame as compared to other of the modified frames and, together, the modified frames include all of the alignment feature; and
  spatially aligning the first image sequence and a second image sequence, during the visual presentation, based on the modified frames in displaying the first image sequence by a first display device and displaying the second image sequence by a second device, to reduce an effect of spatial changes in image alignment between projected images from the first image sequence and the second image sequence during the visual presentation.

19. The system of claim 18, wherein the dual display projection system is configured for randomly displaying different features of the alignment pattern among multiple frames.

20. The dual display projection system of claim 18, wherein the processor device is adapted for:
  modifying image content in frames of the second image sequence with the alignment data that includes the alignment pattern by replacing part of the image content in the frames of the second image sequence with the alignment feature to create modified second image frames; and
  warping the modified second image frames with stored transformation data to generate warped second image frames,
  wherein the dual display projection system further comprises:
    the first display device for displaying the warped second image frames;
    the second display device for displaying the modified frames in the first image sequence;
    an image sensor for capturing the displayed warped second image frames and the displayed modified frames as a captured second image frames and a captured first image frames; and
    a calibration circuit for determining a set of transformation vectors based on a spatial difference between the alignment data in the captured second image frames and the captured first image frames,
  wherein the processor device is adapted for updating the stored transformation data with the set of transformation vectors to produce updated transformation data and for spatially aligning a displayed first image of the first image sequence and a displayed second image of the second image sequence using the updated transformation data.

21. The dual display projection system of claim 20, wherein the image sensor is adapted for being synchronized for capturing the displayed warped second image content frames and the displayed modified frames.

22. The dual display projection system of claim 20, wherein the image sensor is a camera.

23. The dual display projection system of claim 20, wherein the first image sequence and the second image sequence are stereographic image sequences.

24. The method of claim 11, wherein the alignment data includes an alignment pattern, the method further comprising:
  randomly displaying different features of the alignment pattern among multiple frames.

* * * * *